(12) United States Patent
Tanizawa

(10) Patent No.: US 9,755,828 B2
(45) Date of Patent: Sep. 5, 2017

(54) COMMUNICATION DEVICE, COMMUNICATION METHOD, COMPUTER PROGRAM PRODUCT, AND COMMUNICATION SYSTEM

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 165 days.

(21) Appl. No.: 14/873,959

(22) Filed: Oct. 2, 2015

(65) Prior Publication Data

US 2016/0269177 A1  Sep. 15, 2016

(30) Foreign Application Priority Data

Mar. 13, 2015 (JP) ................. 2015-051403

(51) Int. Cl.
*H04L 9/08* (2006.01)

(52) U.S. Cl.
CPC .................. *H04L 9/0858* (2013.01)

(58) Field of Classification Search
None
See application file for complete search history.

(56) References Cited

U.S. PATENT DOCUMENTS

| | | | |
|---|---|---|---|
| 7,734,757 B2 | 6/2010 | Maeda et al. | |
| 8,774,415 B2* | 7/2014 | Baba | H04L 63/062 380/279 |
| 2004/0109564 A1* | 6/2004 | Cerf | H04L 9/0858 380/256 |
| 2006/0062392 A1* | 3/2006 | Lee | H04L 9/0852 380/278 |
| 2007/0009098 A1* | 1/2007 | Tanaka | H04L 1/242 380/30 |
| 2009/0169015 A1* | 7/2009 | Watanabe | H04L 9/0858 380/278 |

(Continued)

FOREIGN PATENT DOCUMENTS

| | | |
|---|---|---|
| JP | 4015385 | 11/2007 |
| JP | 5424008 | 2/2014 |

(Continued)

OTHER PUBLICATIONS

Maurhart, O.: QKD Networks Based on Q3P. Lect. Notes Phys. 797, 151-171 (2010), DOI 10.1007/978-3-642-04831-9 8.*

(Continued)

*Primary Examiner* — Peter Poltorak
(74) *Attorney, Agent, or Firm* — Oblon, McClelland, Maier & Neustadt, L.L.P.

(57) ABSTRACT

According to a communication device includes a sharing processing unit, a storage, and a controller. The sharing processing unit shares an encryption key with one or more external devices. The storage stores therein the encryption key. The controller compares a current amount representing an amount of the stored encryption key with a specified reference amount and performs control to continue or stop sharing processing, which is performed by the sharing processing unit, for sharing the encryption key on the basis of a comparison result.

12 Claims, 20 Drawing Sheets

(56) References Cited

U.S. PATENT DOCUMENTS

| | | | |
|---|---|---|---|
| 2009/0262942 A1* | 10/2009 | Maeda | H04L 9/0855 380/278 |
| 2009/0316910 A1* | 12/2009 | Maeda | H04L 9/0855 380/279 |
| 2010/0318798 A1* | 12/2010 | Binding | G06F 21/54 713/170 |
| 2011/0243331 A1* | 10/2011 | Yasuda | H04L 9/0662 380/279 |
| 2013/0251154 A1 | 9/2013 | Tanizawa et al. | |
| 2014/0181508 A1 | 6/2014 | Tanizawa et al. | |
| 2014/0181522 A1 | 6/2014 | Tanizawa et al. | |
| 2015/0236852 A1 | 8/2015 | Tanizawa | |
| 2015/0271147 A1 | 9/2015 | Tanizawa et al. | |

FOREIGN PATENT DOCUMENTS

| | | |
|---|---|---|
| JP | 2014-53787 | 3/2014 |
| JP | 2014-53816 | 3/2014 |
| JP | 5464413 | 4/2014 |
| JP | 5634427 | 12/2014 |
| JP | 2015-154342 | 8/2015 |
| JP | 2015-179989 A | 10/2015 |

OTHER PUBLICATIONS

O. Maurhart, "Applied Quantum Cryptography, Lect. Notes Phys. 797," 2010, Chapter 8, QKD Networks Based on Q3P, pp. 151-171.
Mehrdad Dianati et al., Architecture and protocols of the future European quantum key distribution network. Security and Communication Networks: DOI:10.1002/sec.13, 2008, pp. 57-74.

* cited by examiner

COMMUNICATION DEVICE, COMMUNICATION METHOD, COMPUTER PROGRAM PRODUCT, AND COMMUNICATION SYSTEM

CROSS-REFERENCE TO RELATED APPLICATION(S)

This application is based upon and claims the benefit of priority from Japanese Patent Application No. 2015-051403, filed on Mar. 13, 2015; the entire contents of which are incorporated herein by reference.

FIELD

Embodiments described herein relate generally to a communication device, a communication method, a computer program product, and a communication system.

BACKGROUND

Quantum key distribution (QKD) is a technique of securely sharing an encryption key between a transmitting node that successively transmits a single photon and a receiving node that receives a single photon while the nodes are connected by an optical fiber. There is also known a technique where a node generates a random number (encryption key) independently of the encryption key shared by QKD and transmits the generated random number to another node for sharing.

In the related art, however, the encryption key is shared after an application or the like makes a request for the encryption key. Accordingly, there has been a problem of processing delay that occurs until the encryption key is used by the application or the like making the request.

DETAILED DESCRIPTION

According to a communication device includes a sharing processing unit, a storage, and a controller. The sharing processing unit shares an encryption key with one or more external devices. The storage stores therein the encryption key. The controller compares a current amount representing an amount of the stored encryption key with a specified reference amount and performs control to continue or stop sharing processing, which is performed by the sharing processing unit, for sharing the encryption key on the basis of a comparison result.

Preferred embodiments of a communication device will be described below in detail with reference to the accompanying drawings.

First Embodiment

An encryption key shared by QKD is ensured not to be tapped on the basis of the principles of quantum mechanics. It is ensured by an information theory that data transmitted/received cannot be deciphered by a tapper with any knowledge when the shared encryption key is used to perform encrypted data communication while employing an encrypted communication method called one time pad.

Figure 1:
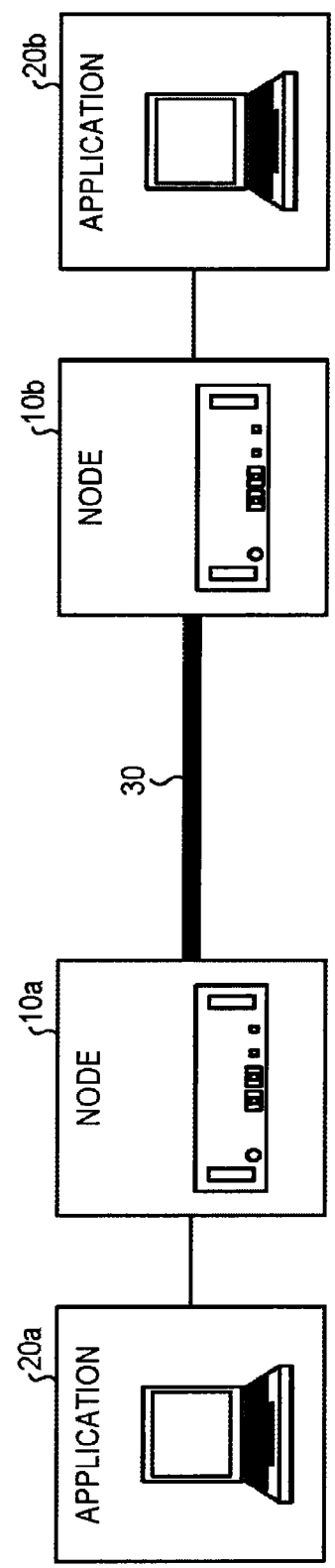
FIG. 1 is a diagram illustrating an example of a configuration of a quantum key distribution system.

FIG. 1 is a diagram illustrating an example of a configuration of a quantum key distribution system. As illustrated in FIG. 1, the quantum key distribution system includes applications 20a and 20b and nodes 10a and 10b. The nodes 10a and 10b are connected by an optical fiber 30, for example. Each of the nodes 10a and 10b corresponds to at least one of a transmitting node and a receiving node. The transmitting node and receiving node may be hereinafter called a node as a general term. The applications 20a and 20b are functions performing the encrypted data communication while using the shared encryption key. The applications 20a and 20b may be realized integrally with the nodes 10a and 10b, respectively.

The encryption key shared between the node 10a and the node 10b is supplied to each of the application 20a and the application 20b. The applications 20a and 20b encrypt data by using the acquired encryption key and perform the encrypted data communication. The method of sharing the encryption key by QKD has a limitation on a distance with which the encryption key can be shared due to the use of a single photon as a medium.

Figure 2:
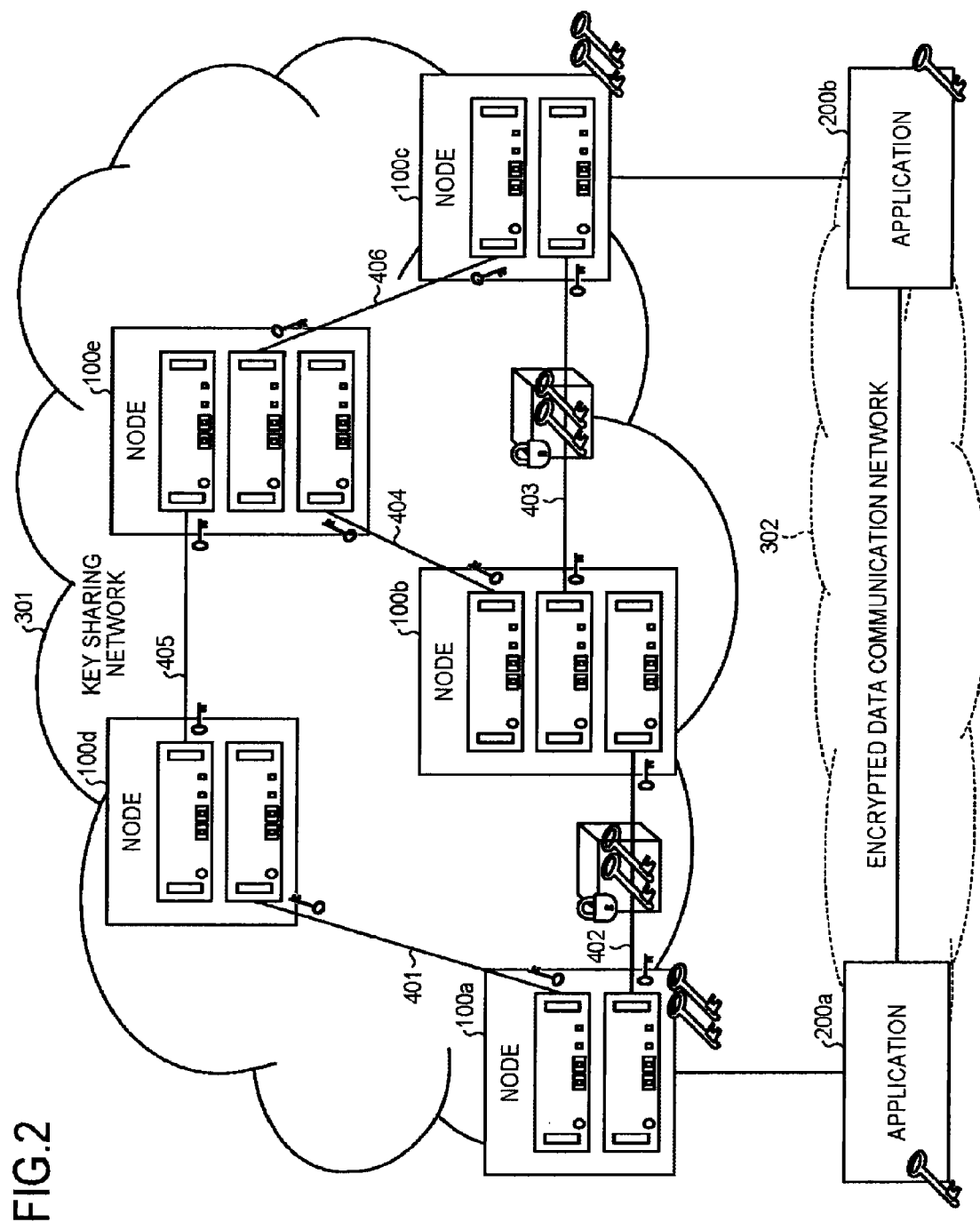
FIG. 2 is a diagram illustrating an example of a configuration of a QKD network.

Now, a quantum key distribution network (QKD network) as an example of a communication system will be described. FIG. 2 is a diagram illustrating an example of a configuration of the QKD network. As illustrated in FIG. 2, the QKD network includes a key sharing network 301 and an encrypted data communication network 302. FIG. 2 illustrates an example where the node and application are realized independently. The key sharing network 301 includes nodes 100a to 100e as communication devices and applications 200a and 200b. The nodes 100a to 100e share a link key by the key sharing network 301.

The nodes 100a to 100e may be simply referred to as a node 100 when the nodes need not be distinguished. The applications 200a and 200b may be simply referred to as an application 200 when the applications need not be distinguished. The number of nodes 100 is not limited to five. Likewise, the number of applications 200 is not limited to two.

The key sharing network 301 is a network where each of a plurality of nodes 100 is connected by a link (links 401 to 406) such as an optical fiber.

FIG. 2 illustrates a configuration where a single node 100 includes a plurality of functions as the transmitting node or receiving node (the nodes 100a, 100c, and 100d include two functions while the nodes 100b and 100e include three functions, for example). Each node 100 may also be configured to include a function in which the transmitting node and the receiving node are integrated together. The latter configuration will be mainly described as an example below.

Each node 100 employs QKD to share an encryption key with a node 100 (adjacent node) connected by the link. The encryption key shared by QKD between the nodes 100 connected by the link corresponds to a link key (first encryption key). The node 100 further has a function of generating another encryption key (an application key being a second encryption key) from random number information or the like irrelevantly to QKD, encrypting the encryption key with the link key, and transferring the key to the adjacent node.

By repeating the processing of encrypting the application key with the link key and transferring the application key, the node 100 can share the application key with an arbitrary node 100 on the key sharing network 301. The application key is transferred on the link while encrypted by the link key that is shared by QKD. Therefore, assuming safety of the node 100 itself, it can be said that safety of the application key is ensured as with the link key.

Figure 3:
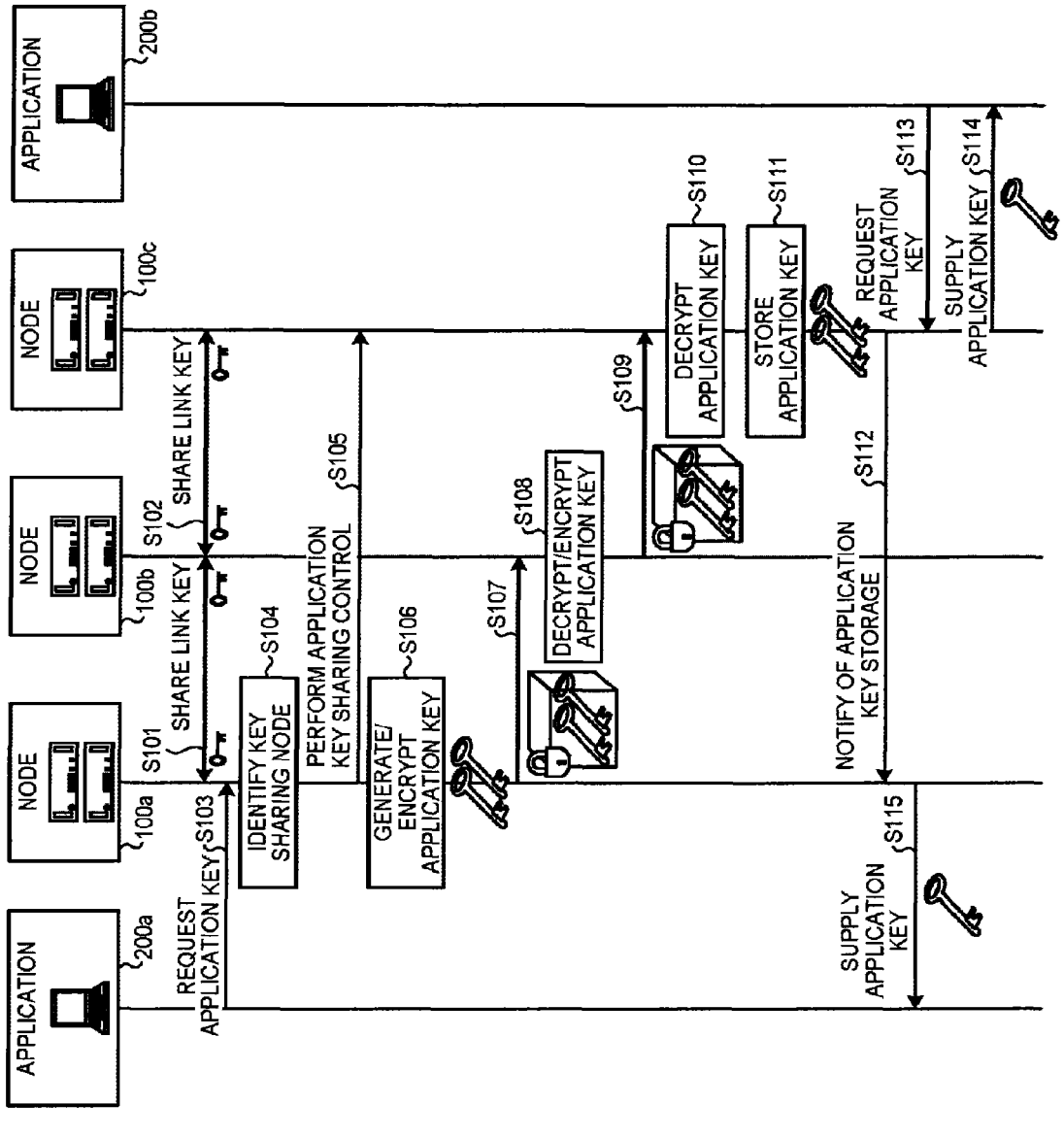
FIG. 3 is a sequence diagram illustrating an example of encryption key sharing processing.

On the other hand, the application 200 is accommodated in the encrypted data communication network 302. Here, the application 200a is assumed to perform the encrypted data communication with the application 200b. There will now be described an example of a sequence in which the application 200 performs the encrypted data communication by using the key sharing network 301 to acquire and share the encryption key. FIG. 3 is a sequence diagram illustrating an example of encryption key sharing processing when an application key is shared through three nodes 100.

The nodes 100a, 100b, and 100c share a link key in advance (steps S101 and S102). The operation of sharing the link key may be repeated after this step as well. The application 200 wishing to perform the encrypted communication is connected to the node 100 on the key sharing network 301. In the example illustrated in FIG. 3, the application 200a is connected to the node 100a while the application 200b is connected to the node 100c.

The application 200a notifies the node 100a that the application wishes to use an encryption key in order to communicate with the application 200b (step S103). Upon receiving the notification, the node 100a identifies the node 100c connected to the application 200b with which the application 200a wishes to communicate (step S104) and shares an application key with the node 100c.

Specifically, the node 100a notifies the node 100c that the node 100a wishes to share the application key and starts application key sharing control (step S105). The node 100a generates the application key by a random number generator or the like and encrypts the generated application key with the link key (link key shared with the node 100b) (step S106). The node 100a then transfers the encrypted application key to the node 100b (step S107).

Upon receiving the encrypted application key, the node 100b decrypts the application key by using the link key shared with the node 100a. The node 100b then encrypts the decrypted application key by using the link key shared with the node 100c (step S108). The node 100b transfers the encrypted application key to the node 100c (step S109).

Upon receiving the encrypted application key, the node 100c decrypts the application key by using the link key shared with the node 100b (step S110). The node 100c stores the decrypted application key into a storage or the like (step S111). The node 100c notifies the node 100a that storing of the application key is completed (step S112). The node 100a and node 100c can therefore share the application key by following the aforementioned procedure.

The node 100a supplies the shared application key to the application 200a (step S115). Upon receiving a request from the application 200b (step S113), the node 100c supplies the shared application key to the application 200b (step S114). The application 200a and application 200b can therefore share the same encryption key (application key). The application 200a and application 200b can now perform the encrypted data communication safely through the encrypted data communication network 302.

The aforementioned encryption key sharing method combining the application key and link key can overcome the limitation on the distance with which the encryption key can be shared, the limitation being caused by the use of QKD. Moreover, the present method in which the node 100 connected by the application 200 controls generation, sharing, and routing of the encryption key (application key) can be implemented by a simple component while utilizing an existing network technology. Here, there has been described a scenario in which the node 100a generates the encryption key (application key) by the random number or the like and shares the key. Information to be shared is not limited to the aforementioned example. The present method can be used as a mechanism in which the node 100a shares arbitrary confidential information such as an encryption key generated by another system, a digital certificate, and a secret key according to a public key method.

The encryption key can be shared with an arbitrary node 100 on the network by constructing the quantum key distribution network (QKD network). Moreover, the technique according to Patent Literature 1 can for example be used to be able to manage a session state of the application key by the node side, use the state information, and determine the node which shares the application key as well as the frequency and timing of sharing the application key.

On the other hand, the method of executing the encryption key sharing processing after the encryption key is requested (step S103) as illustrated in FIG. 3 has a possibility of a processing delay that occurs until the application or the like making the request gets to use the encryption key.

Now, the communication device (node) according to the first embodiment supplies the application key to the application with low delay. Each node using the method of the present embodiment can share in advance the application key to be supplied to the application before receiving the request therefrom. As a result, the node can supply the application key to the application immediately upon receiving the request from the application. In other words, the method of the present embodiment allows the application key to be supplied to the application with low delay.

Figure 4:
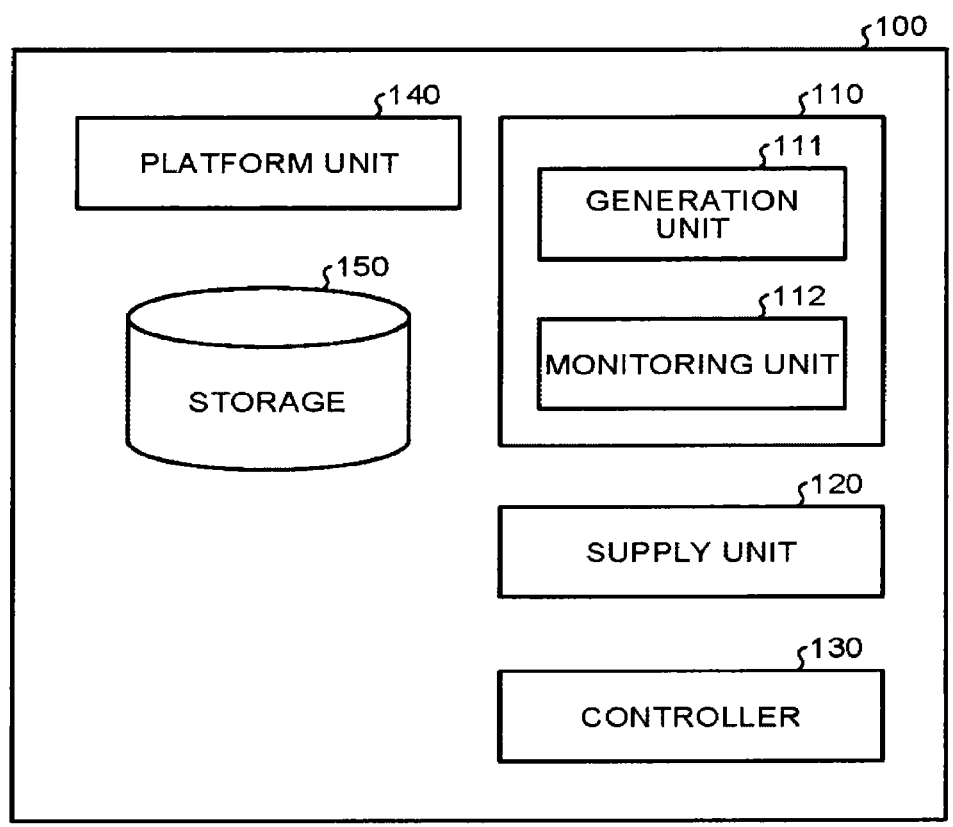
FIG. 4 is a functional block diagram of a node according to a first embodiment.

FIG. 4 is a block diagram illustrating an example of a functional configuration of the node 100 according to the present embodiment. The node 100 includes a sharing processing unit 110, a supply unit 120, a controller 130, a platform unit 140, and a storage 150.

The platform unit 140 supplies a function of an OS (operating system) which manages a basic computer system of the node 100, a network function, a security function and the like.

The storage 150 stores an encryption key. The storage 150 can be configured by a file system or a database. The storage 150 also stores, for each node 100 (sharing destination node) with which the encryption key is to be shared, a piece of information indicating a predetermined reference amount as well as an amount (current amount) of the encryption key currently shared. Information in which the reference amount and current amount of the encryption key are associated will be hereinafter referred to as a key information table.

The reference amount represents an amount of the encryption key to serve as a reference and is used for comparison with the current amount. The reference amount may be set as an amount corresponding to the maximum amount of the encryption key to be shared, for example. Not limited to the maximum value, the reference amount may be any information as long as it represents the amount of the encryption key to serve as the reference. An amount representing the lower limit of the encryption key may be set as the reference amount, for example. The reference amount may have a different value for each sharing destination node or may have the same value for a part or all of sharing destination nodes. There will be described an example where the maximum amount is used as the reference amount.

The sharing processing unit 110 performs sharing processing which shares the encryption key with one or more other nodes 100 (an example of an external device). The sharing processing unit 110 includes a generation unit 111 and a monitoring unit 112.

The generation unit 111 generates the encryption key. The generation unit 111 employs quantum cryptography or the like when generating the link key or employs a random number generator or the like when generating the application key. The monitoring unit 112 monitors an amount of decrease of the encryption key stored in the storage 150, for example.

The controller 130 controls the entire node. The controller 130 executes an encryption key sharing control procedure (encryption key sharing processing) and a supply control procedure, for example. The controller 130 for example compares the current amount with the reference amount and, on the basis of the comparison result, performs control to continue (start) or stop the encryption key sharing processing performed by the sharing processing unit 110 (encryption key sharing processing). The control performed by the controller 130 will be described in detail later on.

The supply unit 120 supplies the encryption key stored in the storage 150 to the application 200. The supply unit 120 may delete from the storage 150 the encryption key supplied to the application 200.

The sharing processing unit 110, the supply unit 120, the controller 130 and the platform unit 140 may be realized by a processor such as a CPU (Central Processing Unit) running a program, namely by software, or may be realized by hardware such as an IC (Integrated Circuit) or a combination of the software and the hardware.

The storage 150 can be configured by various storage mediums used in general such as an HDD (Hard Disk Drive), an optical disk, a memory card, and a RAM (Random Access Memory).

Figure 5:
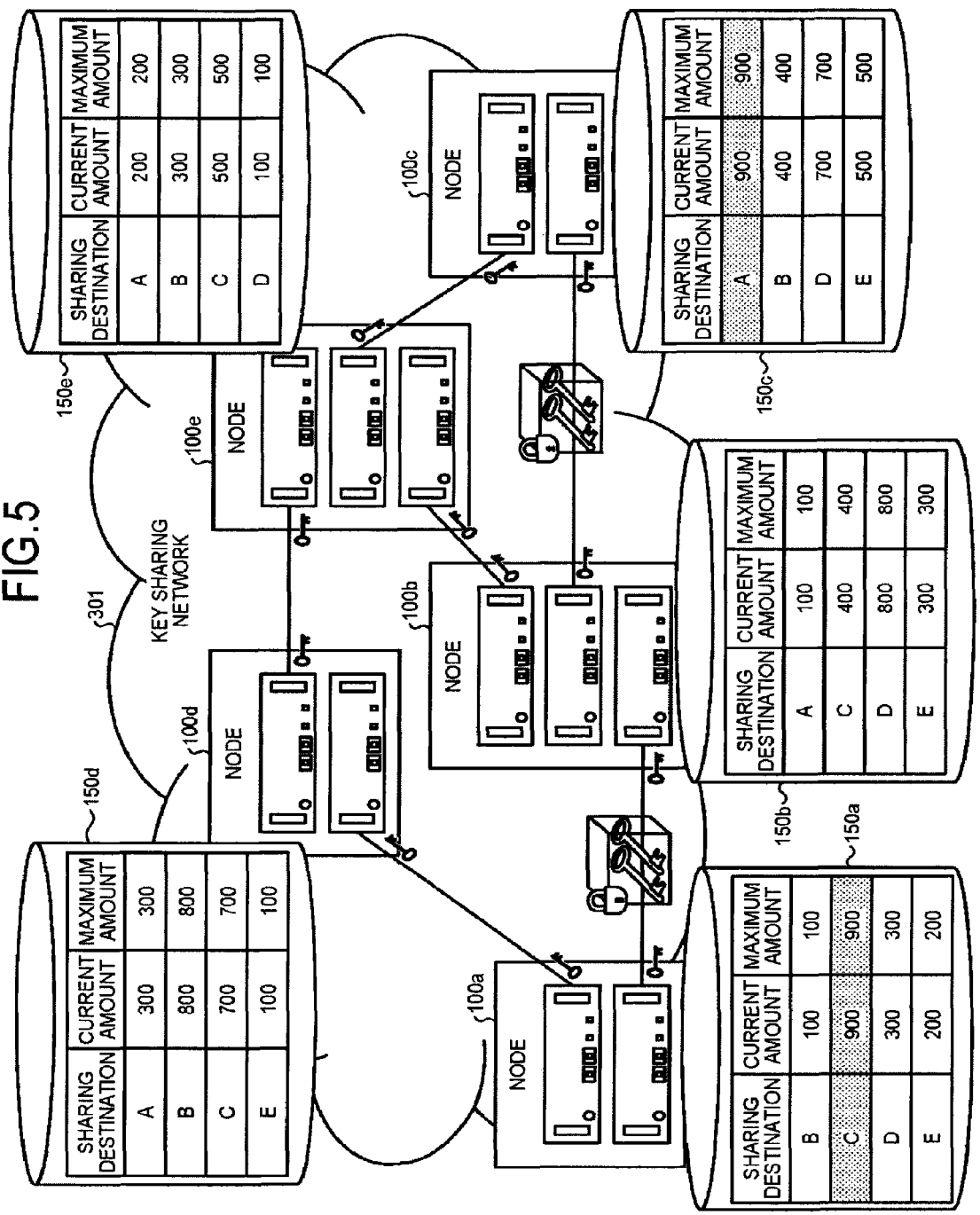
FIG. 5 is a diagram illustrating an example of a key information table of a node.

Next, a specific example of the key information table will be described. FIG. 5 is a diagram illustrating an example of the key information table of each node 100 illustrated in FIG. 2. Each node 100 stores in the storage 150 the key information table in which the sharing destination node, the maximum amount of the application key to be shared with the sharing destination node, and the amount (current amount) of the application key currently shared are associated with one another. Note that storages 150a to 150e indicate the storage 150 included in the nodes 100a to 100e, respectively. The key information table of the application key will be hereinafter referred to as an application key information table.

The application key information table will be described while using the node 100a in FIG. 5 as an example. As illustrated in FIG. 5, the application key information table stores information corresponding to the "maximum amount" and "current amount" for each "sharing destination" node (sharing destination node). Identification information (ID) of the node 100 is set under the "sharing destination", for example. Letters A to E in FIG. 5 represent the identification information of the nodes 100a to 100e, for example.

The "maximum amount" in the application key information table is a piece of information indicating what amount of the application key is desirably shared between the node 100a and another node 100 (the sharing destination node: node 100b, node 100c, node 100d, and node 100e), for example. The amount of application key may be the number of application keys or an overall size of the shared application keys, for example. The information corresponding to the "maximum amount" may be set by a system manager at the time of constructing a system, starting an operation, or performing maintenance.

The "current amount" in the application key information table indicates the amount of application key that is currently held by the node 100a and shared with each "sharing destination node". The "current amount" can be acquired by monitoring the amount of application key currently available on the node 100a. The "current amount" may increase when a new application key is shared or decrease when the application key is supplied to the application 200a. The monitoring unit 112 for example monitors the current amount as well as updates the key information table with the current amount acquired by monitoring.

Each node 100 may refer to the application key information table at start-up and execute the application key sharing control procedure in order to share the application key by the amount corresponding to the "maximum amount" set for each "sharing destination node". As a result, each node 100 can supply the application key to the application 200 with low delay compared to the method in the related art where the node executes the sharing control procedure after being connected by the application 200.

Note that each node 100 may execute the application key sharing control procedure not only at start-up but at an arbitrary timing. The node 100 may execute the sharing control procedure at a timing of regular maintenance when a decrease in the "current amount" is detected while the "current amount" with each "sharing destination node" is referenced on a regular basis, for example.

Figure 6:
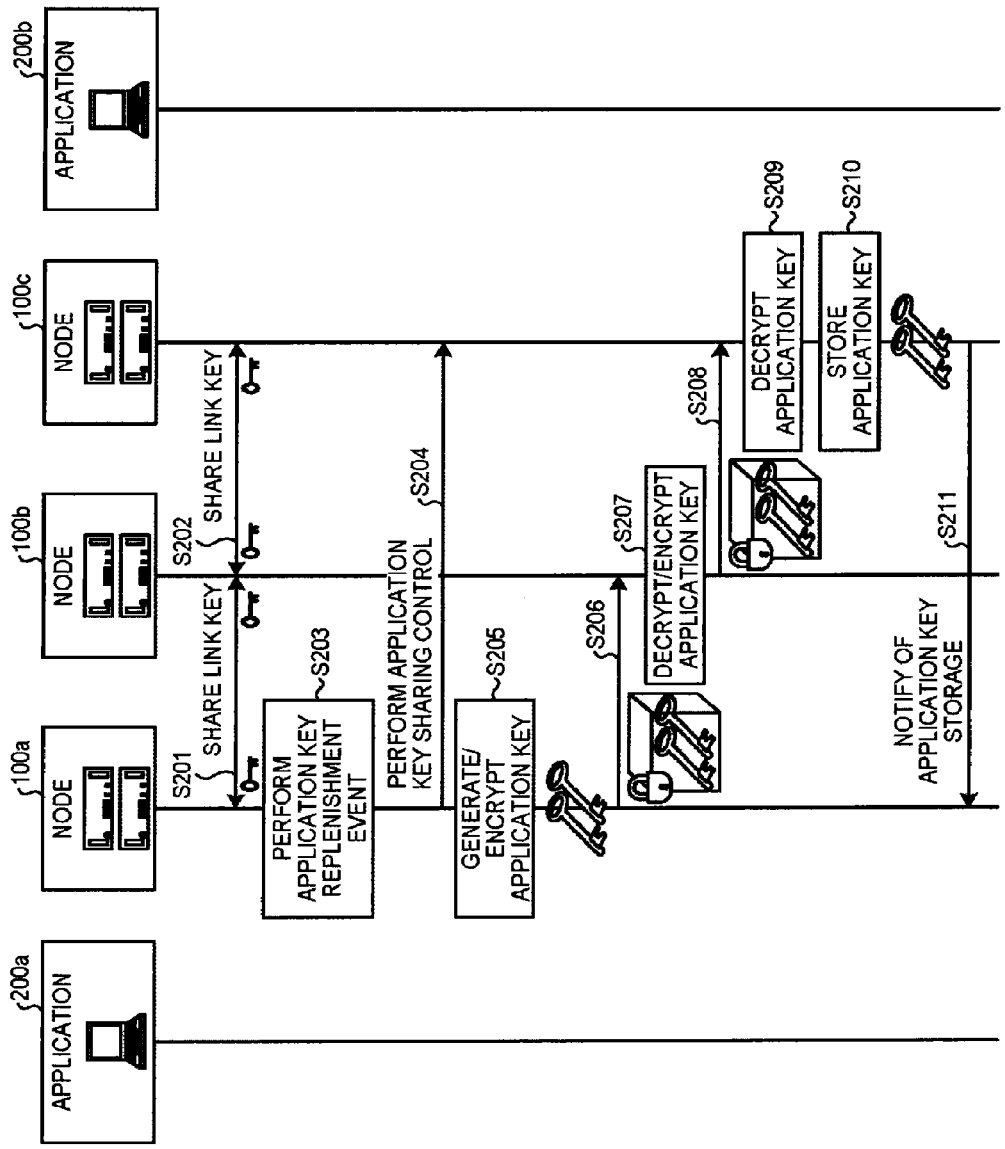
FIG. 6 is a sequence diagram of the encryption key sharing processing according to the first embodiment.

FIG. 6 is a sequence diagram illustrating an example of the encryption key sharing processing according to the present embodiment. While the applications 200a and 200b are illustrated in FIG. 6, these applications 200 have nothing to do with the encryption key sharing processing.

The nodes 100a, 100b, and 100c share a link key in advance (steps S201 and S202). The controller 130 of the node 100a detects an application key replenishment event independently of a request from the application 200 (step S203).

The replenishment event refers to an event indicating that the application key is to be shared with a certain sharing destination node. The controller 130 may also detect the replenishment event by comparing the current amount and reference amount of the sharing destination node. The controller 130 may control whether to start (continue) or stop sharing the application key according to the detected result of the replenishment event.

The controller 130 for example refers to the application key information table and detects that it is the timing to share the application key with the certain sharing destination node (the node 100c in this case) when a decrease in the current amount of the application key satisfies a predetermined condition. The predetermined condition for example refers to the following condition:

The "current amount" is smaller than the "maximum amount";

A difference between the "maximum amount" and the "current amount" is larger than or equal to a threshold (first threshold);

A ratio of the difference between the "maximum amount" and the "current amount" to the "maximum amount" is smaller than or equal to a threshold (second threshold); or A value of the "current amount" is smaller than or equal to the lower limit value.

While detecting the event, the controller 130 may further determine the amount of application key to be shared on the basis of the difference between the "maximum amount" and the "current amount" or the like.

When detecting the replenishment event, the controller 130 notifies the sharing destination node, with which the application key is to be shared, of a piece of information (such as an application key sharing control message) indicating that the node 100a wishes to share the application key (step S204). Executed thereafter is the processing of sharing the application key between the sharing processing unit 110 of the node 100a and the sharing processing unit 110 of the node 100c. A protocol or the like executed in this processing may be similar to that used in the prior art. Steps S205 to S211 in FIG. 6 may for example be executed according to the procedure similar to steps S106 to S112 in FIG. 3.

Note that in the aforementioned description, the node 100 (node 100a in the example illustrated in FIG. 6) detecting that it is the timing to share the application key generates the application key and transfers the generated application key to the node 100c. The method of sharing the application key is not limited to the aforementioned example.

A part or all of the shared application keys may be controlled to be generated by the node 100c and transferred to the node 100a, for example. In order to perform this method, for example, the application key sharing control message transmitted from the node 100a to the node 100c may contain information determining which node 100 is to generate the application key or information provided to negotiate the generation. The application key sharing control message may also contain information on the amount of application key to be generated.

The type of the application key (key type) may be distinguished when the application 200 uses the application key to perform communication by one time pad, for example. That is, it may be distinguished whether the application key is a transmission key (application key for transmission) or a reception key (application key for reception). The application key for transmission is the application key used in transmitting information. The application key for reception is the application key used in receiving information.

In this case, for example, each of the node 100 generating the application key for transmission and the node 100 generating the application key for reception may be identified. Each node 100 may be adapted, concerning only the application key for transmission, to determine a timing to share the application key by referring to the application key information table and generate and share the application key, for example. In other words, the application key for transmission is in this case generated and replenished by the node 100 itself (such as the node 100a). On the other hand, the application key for reception is generated by the sharing destination node 100 (such as the node 100c) and replenished when received by the node 100 (node 100a).

Figure 7:
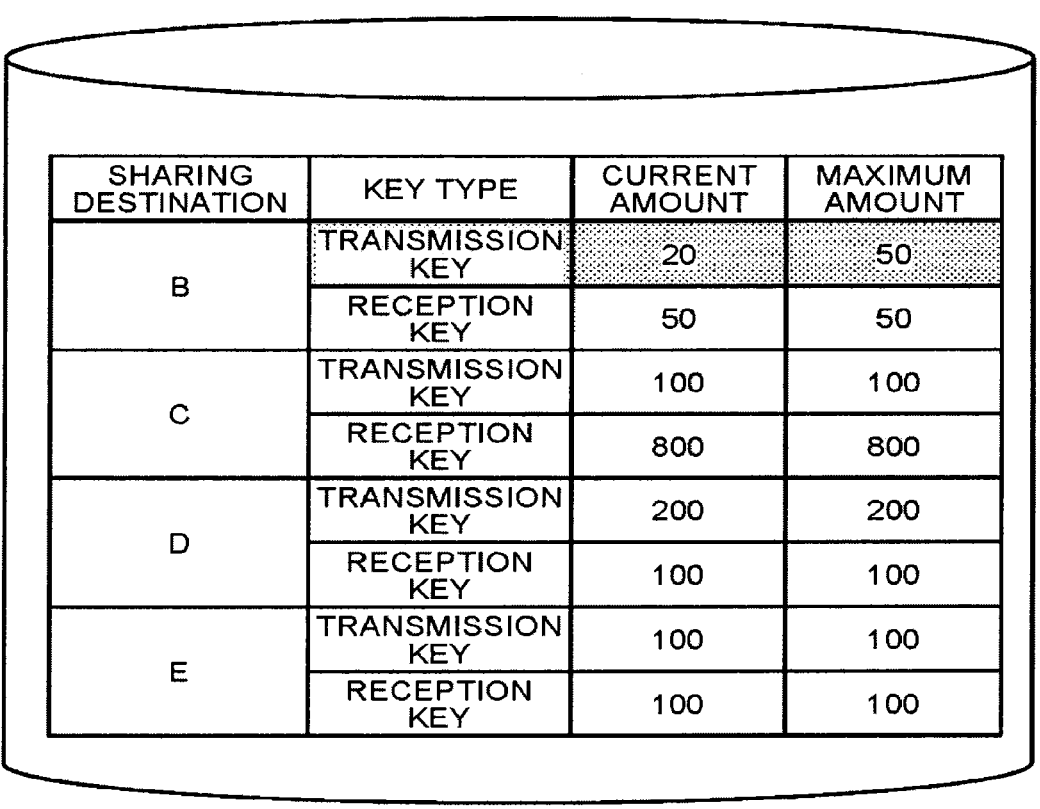
FIG. 7 is a diagram illustrating an example of an application key information table.

FIG. 7 is a diagram illustrating an example of the application key information table stored in the storage 150 of the node 100a when the key type (transmission key and reception key) is distinguished. As illustrated in FIG. 7, the application key information table in this case stores the current amount and maximum amount for each key type of the sharing destination node.

Figure 8:
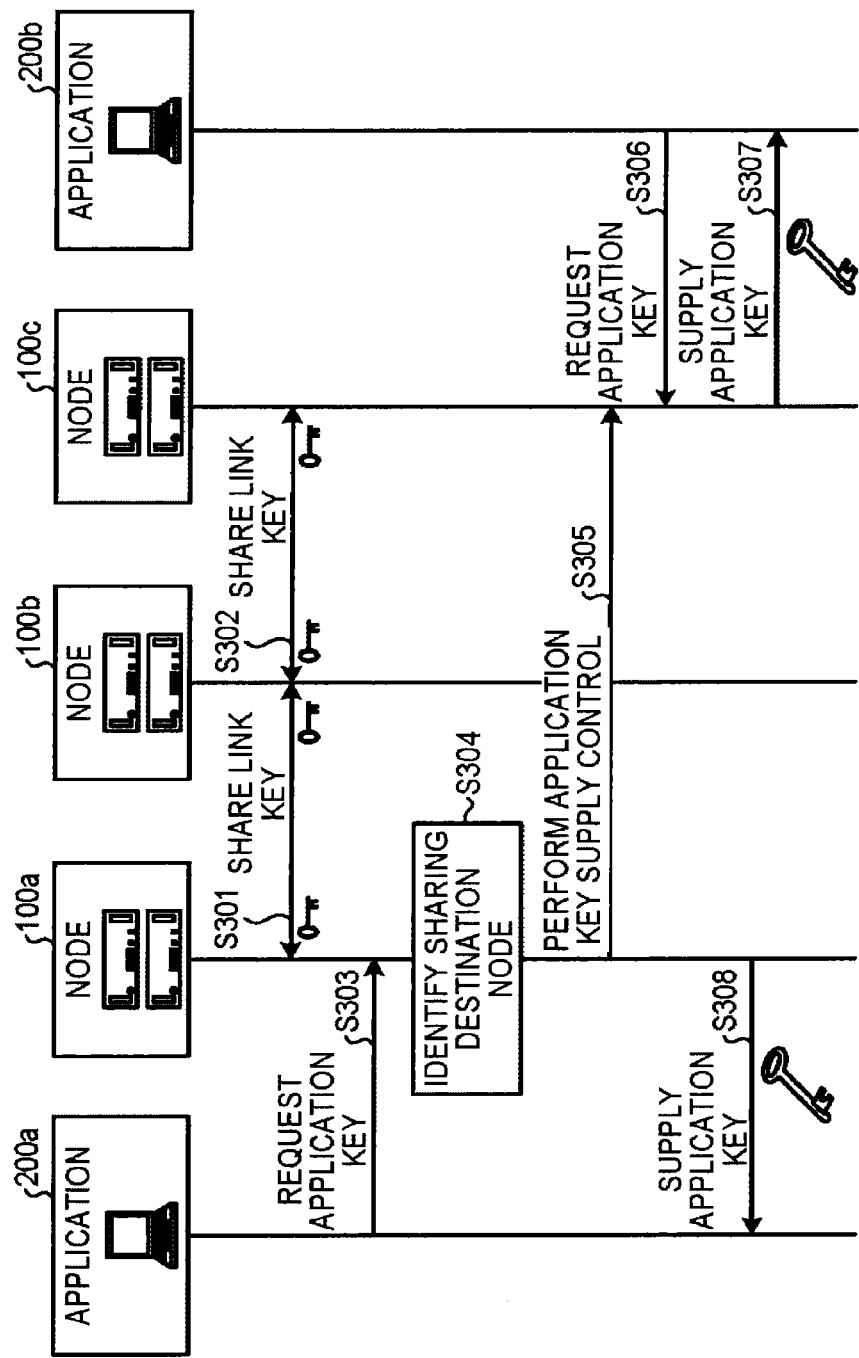
FIG. 8 is a sequence diagram of an application key supply control procedure according to the first embodiment.

Next, there will be described a procedure by which the node 100 supplies the application key to the application 200 (application key supply control procedure). FIG. 8 is a sequence diagram illustrating an example of the application key supply control procedure according to the present embodiment.

The nodes 100a, 100b, and 100c share a link key in advance (steps S301 and S302). When needing the application key to perform the encrypted communication or the like, the application 200a notifies the node 100a of a request to acquire the application key (application key request) (step S303).

The node 100a receiving the application key request identifies a sharing destination node (step S304). The node 100a for example detects, from the application key request message or the like, that the application 200a wishes to communicate with the application 200b. The node 100a identifies that the application 200b is connected to the node 100c by referring to information or the like specifying a connection relationship between the application 200 and the node 100, for example. Accordingly, the node 100a identifies the node 100c as the sharing destination node with which the application key to be supplied to the application 200a is shared.

When the application key is already shared with the identified sharing destination node by the encryption key sharing processing illustrated in FIG. 6, the supply unit 120 of the node 100 can supply the already-shared application key to the application 200. That is, the supply unit 120 of the node 100a supplies the application key to the application 200a (step S308). Upon receiving a request from the application 200b (step S306), the node 100c supplies the application key to the application 200b (step S307).

The node 100 can thus supply the application key to the application 200 immediately after receiving the application key request without performing the application key generation processing by the random number generator and the processing of encrypting the application key with the link key and transferring the key. That is, the node 100 can supply the application key with low delay.

The nodes 100a and 100c need not follow the application key sharing control procedure (FIG. 6) but may simply exchange a control message (application key supply control) before supplying the application key to the application 200 (step S305 in FIG. 8). The control message may contain the following information in order to determine and notify which of the application keys already shared between the node 100a and the node 100c is to be supplied to the application 200a:

Information related to identification information (ID) of the application key; and
Information indicating a method of determining the application key supplied to the application 200a (assigned to the application 200a assuming that the key is used thereby)

After supplying the application key to the application 200a and application 200c, the nodes 100a and 100c decrease the "current amount" in the application key information table stored in the nodes by a value corresponding to the amount of application key supplied.

Note that while five nodes are included in the aforementioned key sharing network 301, the number of nodes is not limited to five. Any number of nodes larger than or equal to two may be provided. When a large number of nodes are provided (such as 100 or mode), it is not desired in some cases in terms of a storage capacity of the application key to perform control such that each node 100 shares the application key in advance with all other nodes 100 by using the application key information table. In this case, the application key information table may be used to share the application key in advance with not all the nodes 100 but a part of the nodes 100. When the application key is requested to be shared with a sharing destination node not sharing the application key in advance, the application key may be shared by the method illustrated in FIG. 3 as is the case with the prior art, for example.

Second Embodiment

In the first embodiment, the reference amount such as the "maximum amount" in the application key information table is set in advance by a manager or the like. A second embodiment is configured to dynamically change a reference amount while in operation.

Figure 9:
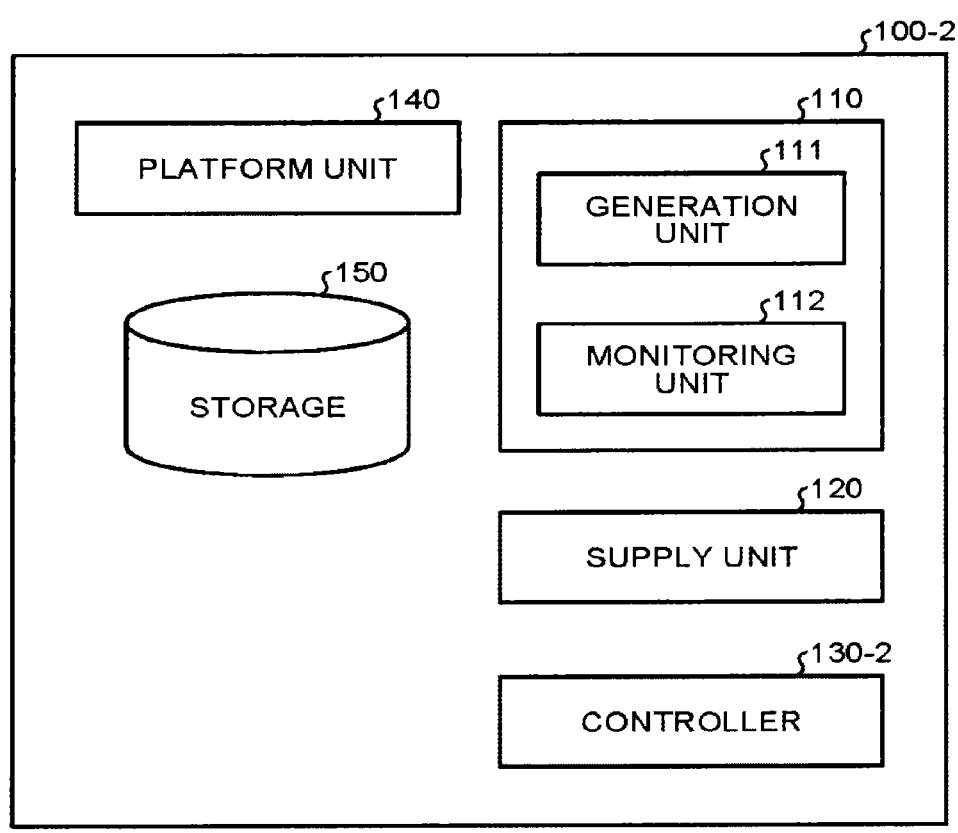
FIG. 9 is a functional block diagram of a node according to a second embodiment.

FIG. 9 is a block diagram illustrating an example of a configuration of a node 100-2 according to the second embodiment. As illustrated in FIG. 9, the node 100-2 includes a sharing processing unit 110, a supply unit 120, a controller 130-2, a platform unit 140, and a storage 150.

The controller 130-2 of the second embodiment has a different function from that of the first embodiment. The rest of the configuration and function is similar to what is illustrated in the block diagram of the node 100 according to the first embodiment as illustrated in FIG. 4, and is thus assigned the same reference numeral as that in FIG. 4 to omit description of such configuration and function.

The controller 130-2 is different from the controller 130 of the first embodiment in that there is added a control function which dynamically changes the reference amount (sharing amount control procedure). The controller 130-2 changes the reference amount according to a decrement frequency of a current amount of an application key, for example. The controller 130-2 controls a monitoring unit 112 such that the decrement frequency of the application key is monitored for each "sharing destination node", for example. The decrement frequency of the application key corresponds to a frequency of use (use frequency) of the application key. The controller 130-2 performs control to increase the "maximum amount" as the reference amount of an application key with a high use frequency (decrement frequency).

The method of controlling the reference amount is not limited to the aforementioned example. The reference amount may be changed according to at least one of the number of applications, an amount of encryption key requested by an application, a storage capacity of the storage 150, and a free space in the storage 150, for example.

Figure 10:
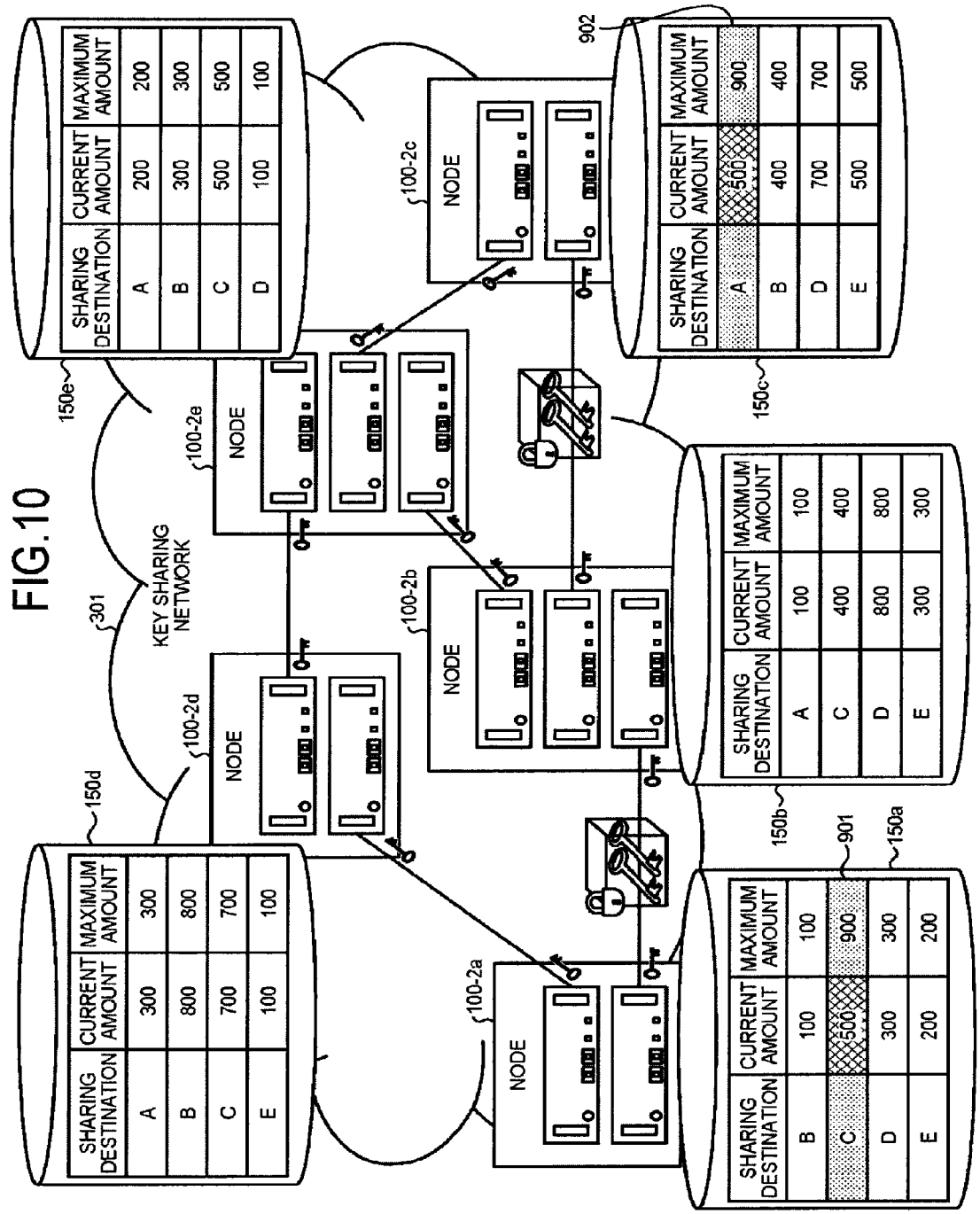
FIG. 10 is a diagram illustrating a specific example of processing which changes the maximum amount.
Figure 11:
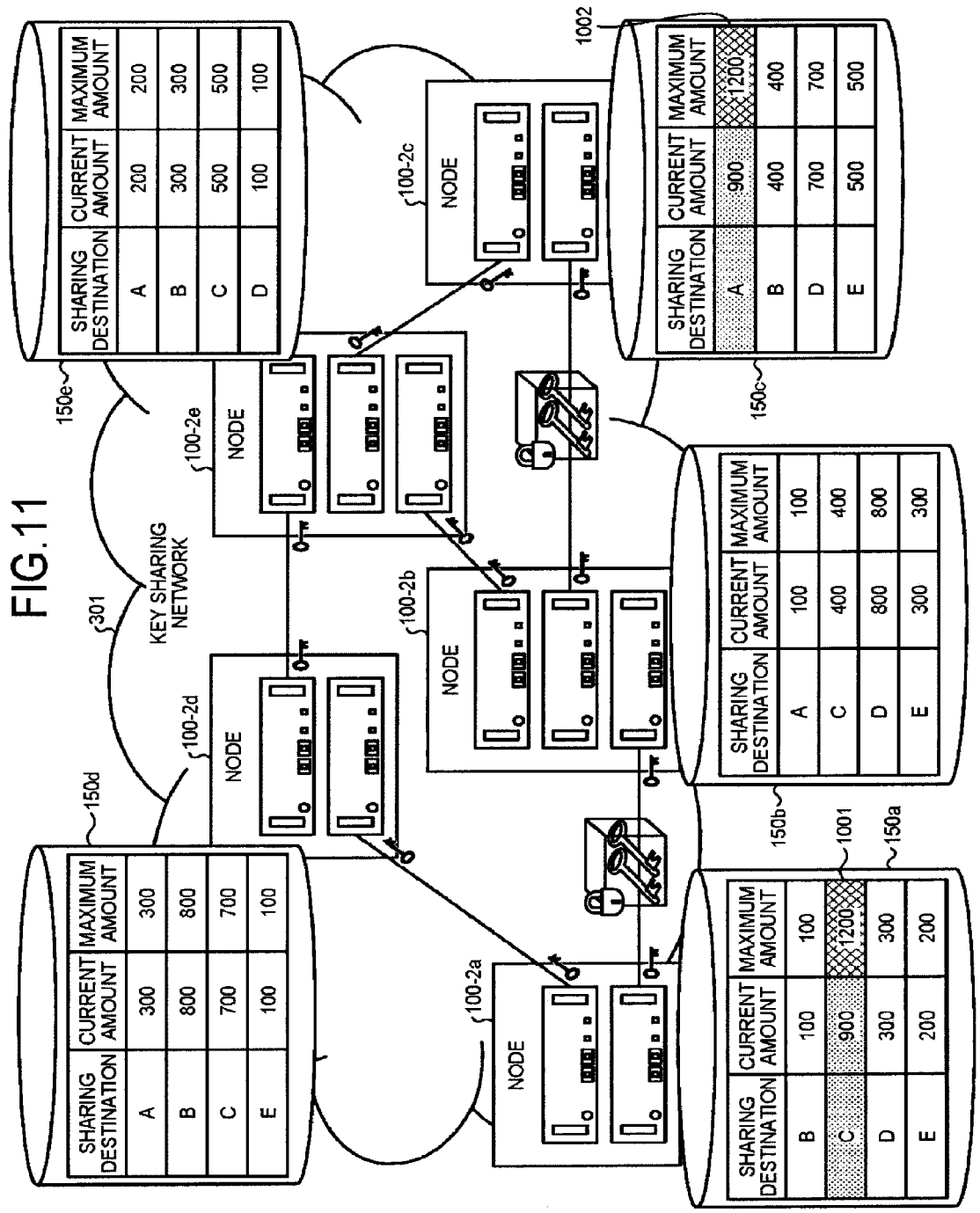
FIG. 11 is a diagram illustrating a specific example of the processing which changes the maximum amount.

FIGS. 10 and 11 are diagrams each illustrating a specific example of processing which changes the maximum amount. Here, the amount of application key shared between a node 100-2a and a node 100-2c is assumed to be decreased (used) frequently. A value "901" and a value "902" in FIG. 10 indicate an example where the current amount of an application key shared between the node 100-2a and the node 100-2c is decreased to 500. An application key corresponding to the decreased amount is replenished according to the encryption key sharing processing described with reference to FIG. 6 of the first embodiment, for example.

In addition, in the second embodiment, information indicating the "maximum amount" of the application key to be shared between the node 100-2a and the node 100-2c is increased as illustrated by a value "1001" and a value "1002" in FIG. 11 according to information on the decrement frequency of the application key, for example.

The controller 130-2 of the node 100-2 may be adapted to control the monitoring unit 112 to monitor the amount of decrease of the "current amount" of the application key per unit time for each sharing destination node, and perform control to increase the "maximum amount" when the amount of decrease is larger than or equal to a certain threshold (third threshold), for example. The "maximum amount" may be changed not by comparing an absolute value of the amount of decrease and the threshold but according to a relative change with respect to the amount of decrease of another node 100-2. The controller 130-2 may for example control the monitoring unit 112 to monitor the amount of decrease of the "current amount" of the application key for each "sharing destination node" and, when the amount of decrease of a certain "sharing destination node" (such as the node 100-2a) is larger than or equal to a certain threshold (fourth threshold) compared to the amount of decrease of another "sharing destination node", perform control to increase the "maximum amount" with the sharing destination node (node 100-2a).

There has been described the method of changing the "maximum amount" of the application key on the basis of the amount of change in the "current amount" of the application key. Another value may also be referenced in changing the "maximum amount" of the application key. Each node 100-2 may for example monitor and refer to information such as the number of applications 200 connected to each node 100-2 as well as an amount or size per unit time of the application key requested for each node 100-2.

It is assumed for example that, on the node 100-2a, the number of applications 200 connected to the node 100-2a and communicating with an application 200 connected to the node 100-2c is changed from two to three. In this case, the controller 130-2 of the node 100-2a may perform control to increase the "maximum amount" of the application key that is shared with the node 100-2c.

A certain application 200 connected to the node 100-2a and communicating with an application 200 connected to the node 100-2c may notify the node 100-2a of an amount per unit time of the application key requested. When the amount per unit time of the application key requested is increased in the aforementioned situation, the controller 130-2 of the node 100-2a may perform control to increase the "maximum amount" of the application key to be shared with the node 100-2c.

A total amount of the application key that can be held in advance by a certain node 100-2 has an upper limit that depends on the capacity of a storage device used (the storage 150). It is thus not possible to limitlessly increase the "maximum amount" of the application key to be shared in advance with the "sharing destination node". Accordingly, the controller 130-2 may perform control to increase the "maximum amount" while considering the storage capacity or free space of the storage 150 currently available for the node 100-2.

When increasing the "maximum amount" of the application key to be shared with a certain sharing destination node, the controller 130-2 may decrease the "maximum amount" of the application key to be shared with another sharing destination node. The controller 130-2 may be adapted to control the monitoring unit 112 to monitor the amount of decrease of the "current amount" of the application key per unit time for each sharing destination node, and perform control to decrease the "maximum amount" of the sharing destination node with the amount of decrease smaller than or equal to a certain threshold (fifth threshold), for example.

The "maximum amount" may be changed not by comparing the absolute value of the amount of decrease and the threshold but according to a relative change with respect to the amount of decrease of another node 100-2. The controller 130-2 may for example control the monitoring unit 112 to monitor the amount of decrease of the "current amount" of the application key for each "sharing destination node" and, when the amount of decrease of a certain "sharing destination node" (such as the node 100-2a) is smaller than a certain threshold (sixth threshold) or larger compared to the amount of decrease of another "sharing destination node", perform control to decrease the "maximum amount" with the sharing destination node (node 100-2a).

The controller 130-2 may also determine the sharing destination node for which the "maximum amount" is decreased on the basis of the current "maximum amount". That is, the controller 130-2 may preferentially decrease the "maximum amount" of the sharing destination node with a larger "maximum amount".

Moreover, the controller 130-2 may decrease and increase the maximum amount at the same time. The controller 130-2 may decrease the maximum amount only when the storage capacity runs short by increasing the maximum amount. As a result, the limited storage capacity of the storage 150 storing the application key can be used efficiently.

Figure 12:
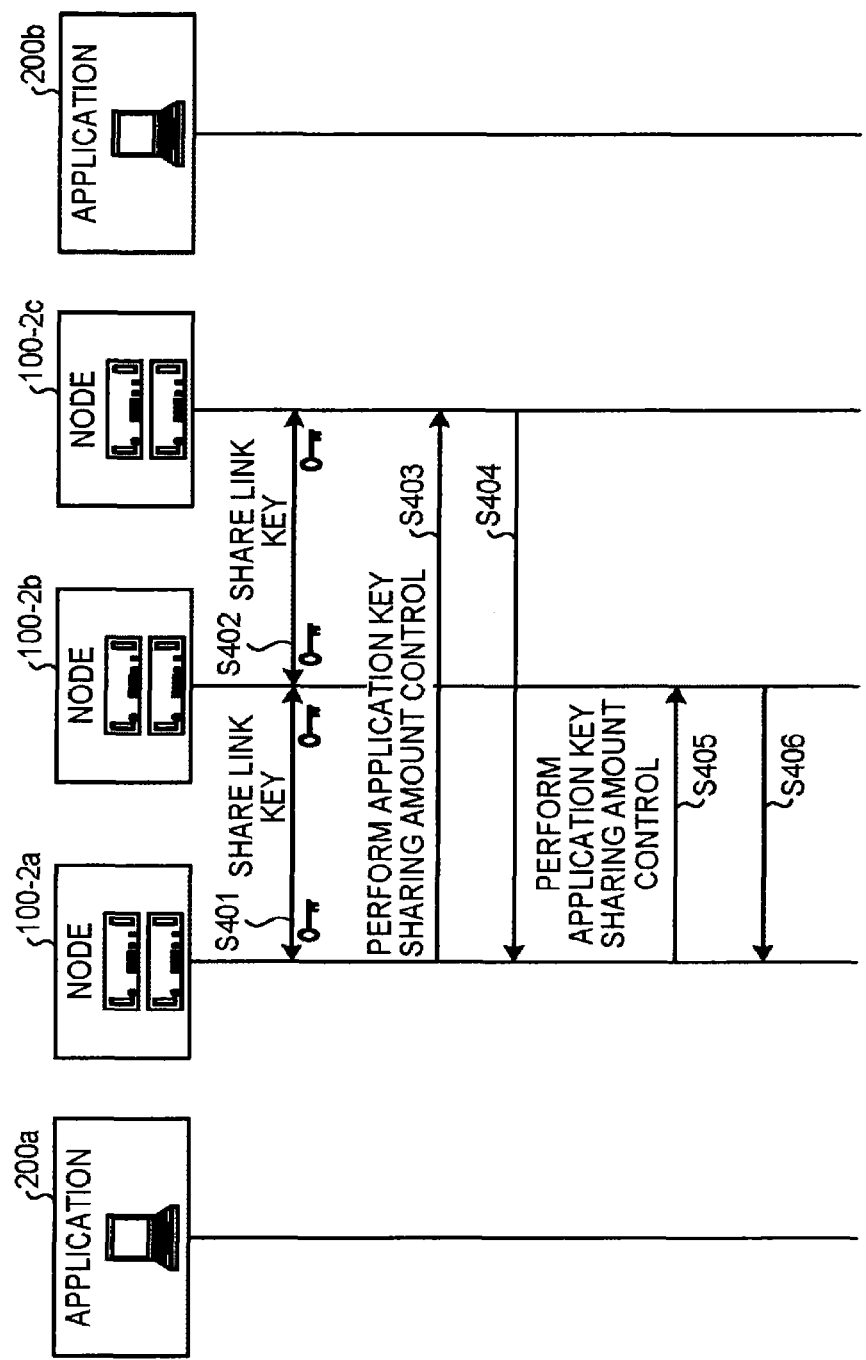
FIG. 12 is a sequence diagram of sharing amount control processing according to the second embodiment.

Next, the sharing amount control processing (sharing amount control procedure) performed by the node 100-2 according to the second embodiment configured in the aforementioned manner will be described with reference to FIG. 12. FIG. 12 is a sequence diagram illustrating an example of the sharing amount control processing according to the second embodiment.

The nodes 100-2a, 100-2b, and 100-2c share a link key in advance (steps S401 and S402).

The node 100-2a transmits a control message to the node 100-2c to notify that a control (application key sharing amount control) which increases the "maximum amount" is to be performed (step S403). The control message may be transferred independently between the nodes 100-2 or transferred in integration with the application key sharing control message in the sharing control processing illustrated in FIG. 6, for example. The control message may also be transferred in integration with the application key supply control message in the application key supply control procedure illustrated in FIG. 8.

The control message transmitted in the application key sharing amount control contains at least information on the size of the maximum amount to be increased or the size of the maximum amount after increase.

The nodes 100-2a and 100-2c may have different available storage capacities. It is thus possible that the maximum amount cannot be increased on the node 100-2c even when the node 100-2a makes a request to the node 100-2c to increase the maximum amount. Accordingly, there may be required a response message (from the node 100-2c to the node 100-2a) to respond to the control message transmitted in the application key sharing amount control (step S404). The response message may contain information on whether the maximum amount may actually be increased and, when it may be increased, how much the maximum amount is to be increased. The maximum amount may actually be changed after transmitting the response message.

In FIG. 12, on the other hand, the node 100-2a also exchanges the control message of the application key sharing amount control with the node 100-2b (steps S405 and S406). The control message notifies of a decrease in the maximum amount, for example. In general, the application key is not shared with the node 100-2 for which the maximum amount is decreased. Therefore, the control message transmitted to decrease the maximum amount need not be transferred in integration with the message of the application key sharing control.

Likewise, the control message transmitted to decrease the maximum amount is less likely to be transferred in integration with the control message of the application key supply control (FIG. 8 and the like). The control message transmitted to decrease the maximum amount contains at least information on the size of the maximum amount to be decreased or the size of the maximum amount after decrease.

There may be a case where the current amount need be decreased as well by decreasing the maximum amount. Decreasing the current amount corresponds to discarding (deleting) the application key currently held. In this case, the message of the application key sharing amount control may also contain information on which of the application key currently held is to be discarded. The supply unit 120 may determine the application key to be discarded according to a predetermined rule, for example. A method of determining the application key to be discarded includes deleting an application key that is shared the longest among the application keys, deleting an application key in order from the one with the youngest identification information (ID) among the application keys, and determining an application key to be deleted by specifying the ID, for example.

Therefore, the communication device according to the second embodiment can dynamically change the reference amount.

Third Embodiment

In the aforementioned embodiment, the node holds the current amount and maximum amount of the application key by using the application key information table. One effect of such configuration is that a key can be supplied immediately upon request for the key from the application. As a secondary effect, the use efficiency of the storage capacity can be increased by effectively using the limited capacity of the storage device to hold and accumulate the key that is most likely to be used in a situation where the key is shared among a plurality of nodes.

Control similar to the control against the application key performed in the aforementioned embodiment may also be performed against the link key. A communication device according to a third embodiment executes processing similar to that of the aforementioned embodiment against a link key instead of an application key.

Figure 13:
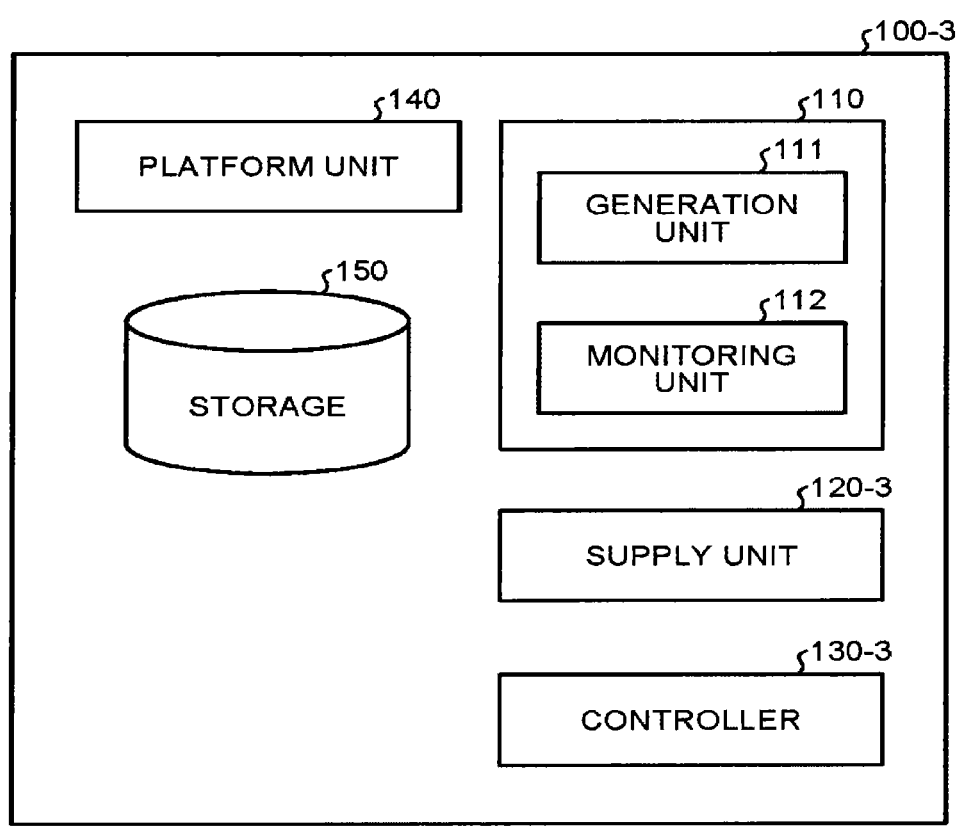
FIG. 13 is a functional block diagram of a node according to a third embodiment.

FIG. 13 is a block diagram illustrating an example of a configuration of a node 100-3 according to the third embodiment. As illustrated in FIG. 13, the node 100-3 includes a sharing processing unit 110, a supply unit 120-3, a controller 130-3, a platform unit 140, and a storage 150.

The supply unit 120-3 and controller 130-2 of the third embodiment have different functions from those of the first embodiment. The rest of the configuration and function is similar to what is illustrated in the block diagram of the node 100 according to the first embodiment as illustrated in FIG. 4, and is thus assigned the same reference numeral as that in FIG. 4 to omit description of such configuration and function.

The supply unit 120-3 is different from the supply unit 120 of the aforementioned embodiment in that the link key instead of the application key is supplied as an encryption key. The controller 130-3 executes a sharing control procedure (encryption key sharing processing) and a supply control procedure while using the link key instead of the application key as the encryption key.

Figure 14:
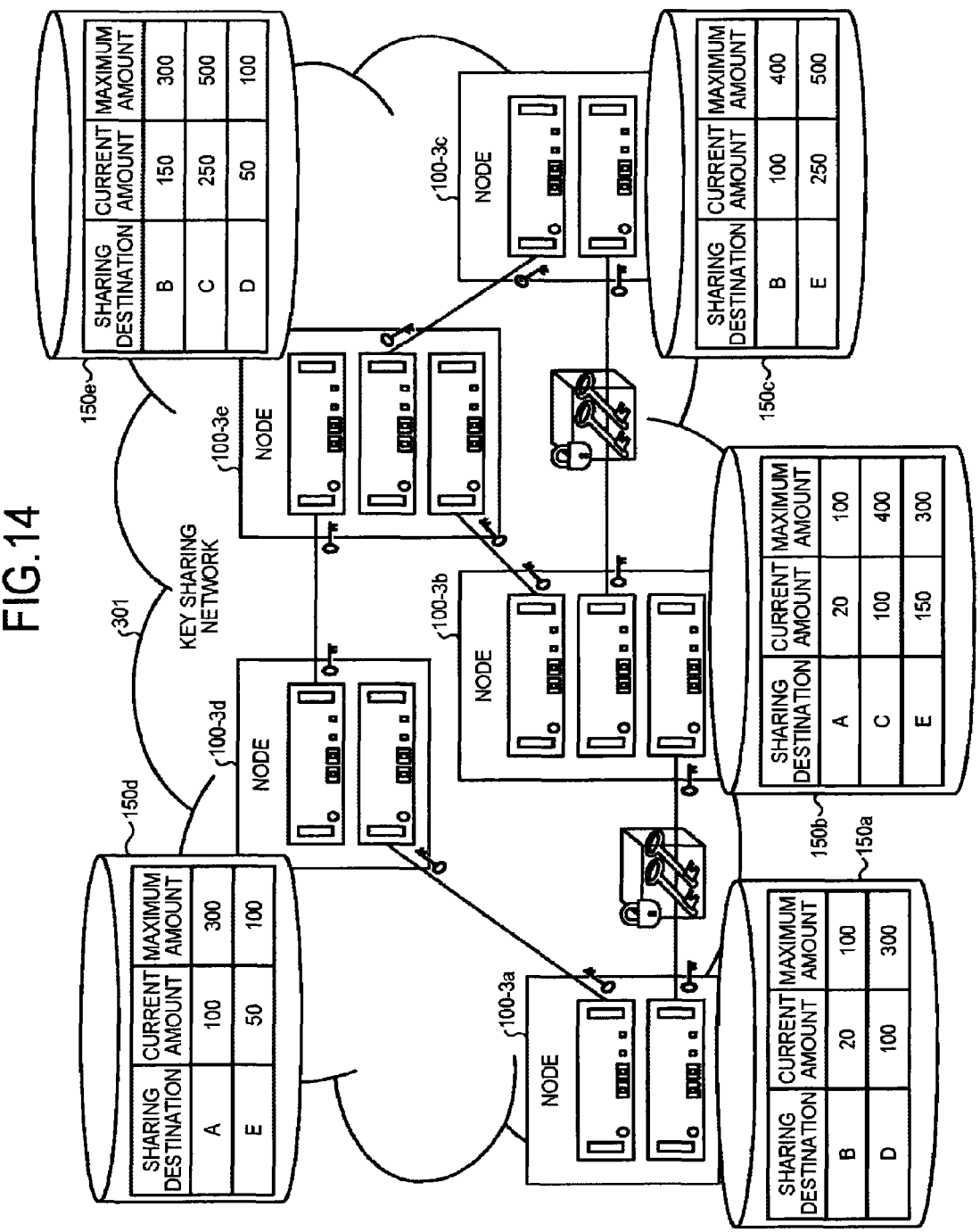
FIG. 14 is a diagram illustrating an example of a link key information table.

The storage 150 of the present embodiment stores a key information table of the link key. The key information table of the link key will be hereinafter referred to as a link key information table. FIG. 14 is a diagram illustrating an example of the link key information table of each node 100-3 illustrated in FIG. 13.

Figure 15:
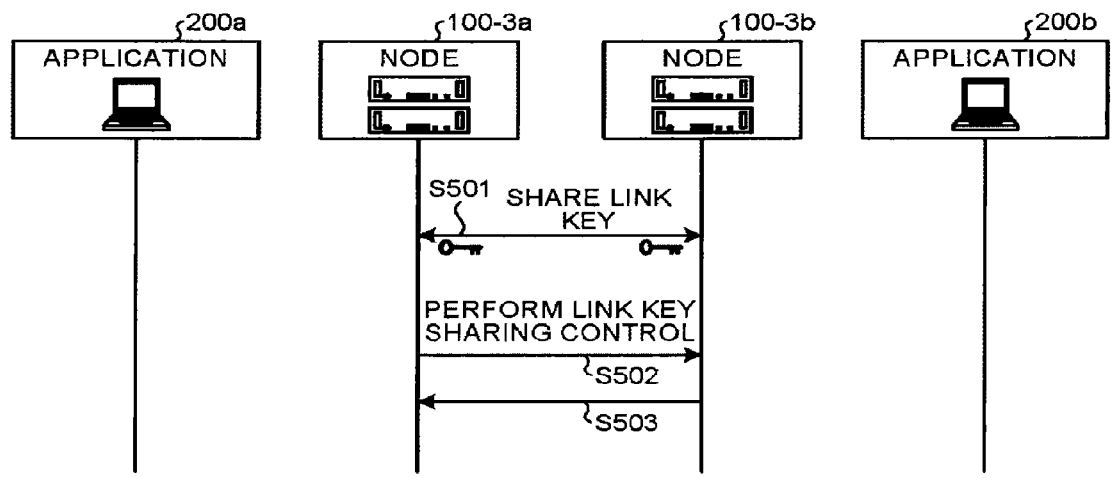
FIG. 15 is a sequence diagram of encryption key sharing processing according to the third embodiment.

FIG. 15 is a sequence diagram illustrating an example of the encryption key sharing processing (sharing control procedure) according to the present embodiment. The sharing control procedure of the link key corresponds to generation of a link key in quantum cryptography. The controller 130-3 thus controls the sharing processing unit 110 to generate and share the link key at all times by the quantum cryptography until a current amount reaches the maximum amount (step S501).

The controller 130-3 may stop generating or storing the link key when the current amount reaches the maximum amount. The controller 130-3 for example performs an operation to stop generating the link key by the quantum cryptography or an operation to continue generating the link key by the quantum cryptography but discard the generated link key without storing it. When the generation or storage of the link key is to be stopped, the controller 130-3 of each node 100-3 exchanges a control message pertaining to link key sharing (steps S502 and S503). When the generation of the link key is to be stopped, the control message may contain information on stoppage of the key generation starting with the link key assigned with which identification information (ID), for example. When the storage of the link key is to be stopped, the control message may contain information on stoppage of the key storage starting with the link key assigned with which ID, or information on whether or not the key is stored for each ID of the link key.

Figure 16:
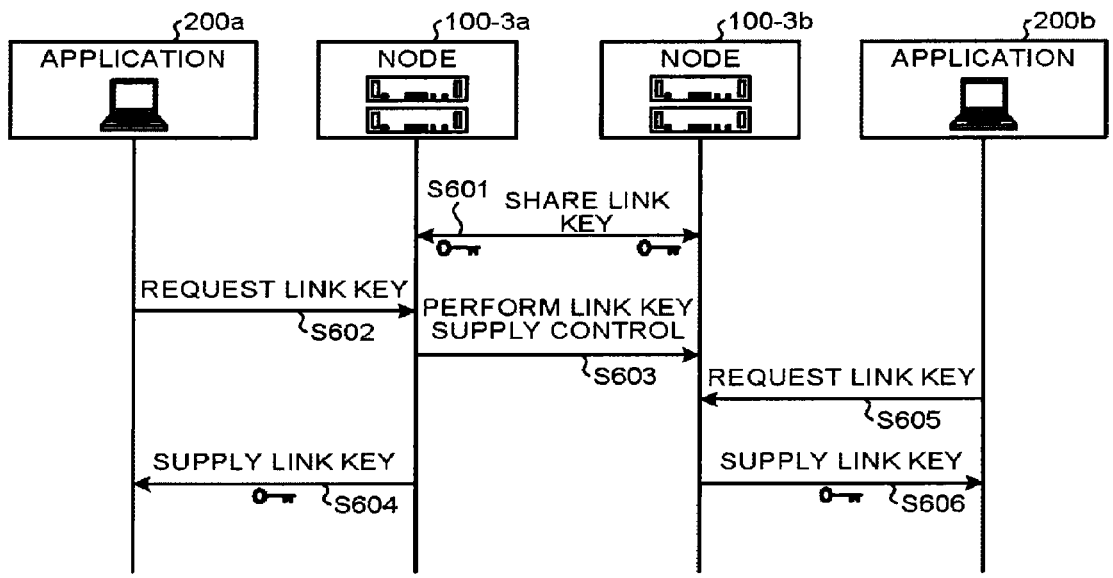
FIG. 16 is a sequence diagram of a supply control procedure according to the third embodiment.

FIG. 16 is a sequence diagram illustrating an example of the link key supply control procedure according to the present embodiment. Upon receiving a request to supply a link key from an application 200, the node 100-3 supplies the requested link key as is.

Nodes 100-3a and 100-3b share a link key in advance (step S601). When needing a link key to perform encrypted communication or the like, an application 200a notifies the node 100-3a of the request to supply the link key (link key request) (step S602).

The node 100-3a receiving the link key request transmits a control message of the link key supply control to the node 100-3b as needed (step S603). The control message containing information (such as identification information) used to determine the link key may be exchanged when it is required to determine the link key to be supplied to the application 200, for example.

The node 100-3a supplies the requested link key to the application 200a (step S604). Likewise, upon receiving a request to supply the link key from an application 200b (step S605), the node 100-3b supplies the link key to the application 200b according to the request (step S606).

The controller 130-3 may further perform control which dynamically changes a reference amount (sharing amount control procedure) as with the second embodiment. The controller 130-3 may increase or decrease the maximum amount of the link key by a method similar to the method described in the second embodiment when a current amount of the link key possessed (current amount) reaches the maximum amount, for example.

Figure 17:
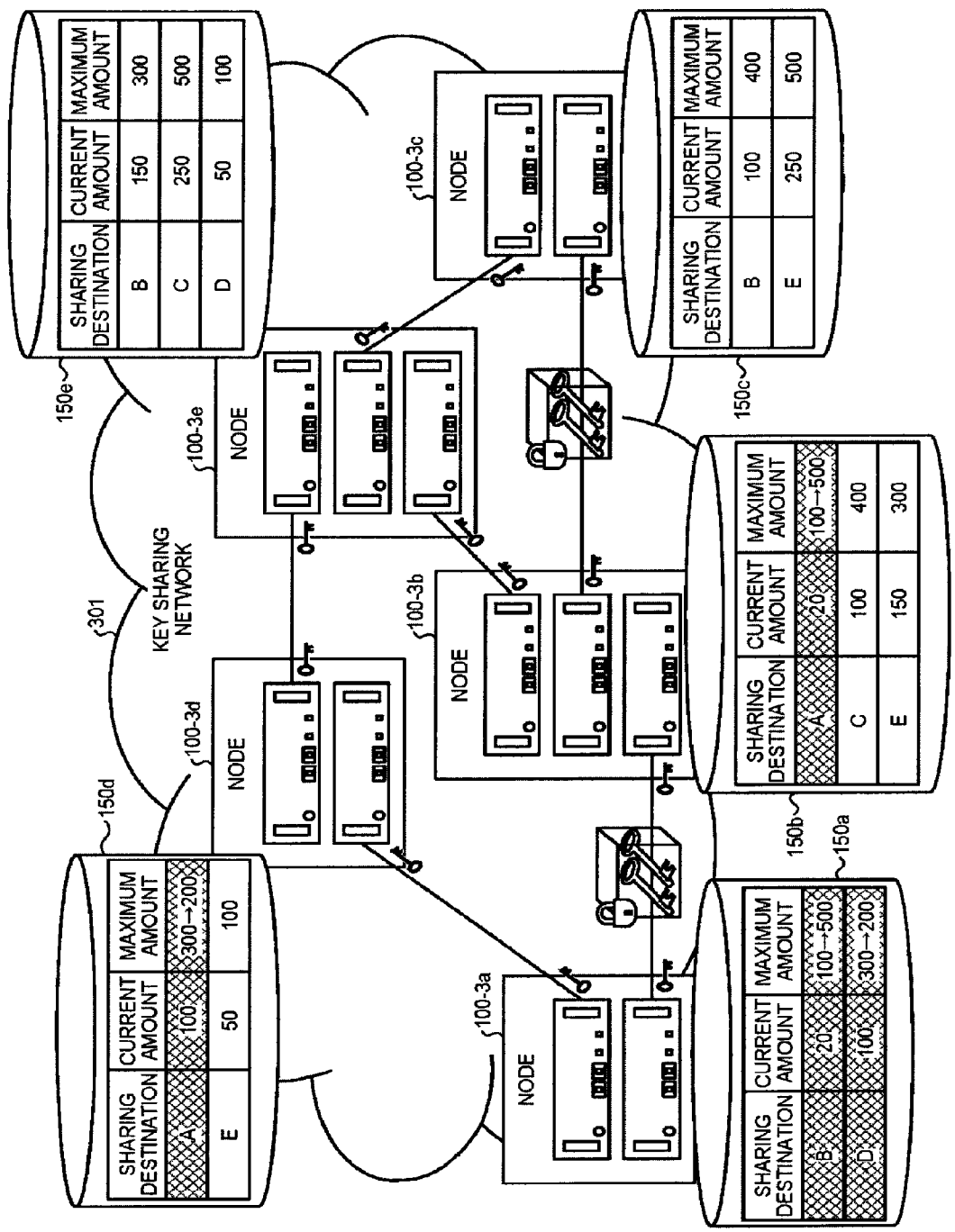
FIG. 17 is a diagram illustrating an example of the link key information table.

FIG. 17 is a diagram illustrating an example of the link key information table after the sharing amount control procedure is executed. A shaded area in the table indicates data for which the maximum amount is changed.

As illustrated in FIG. 17, for example, the node 100-3a shares the link key with a plurality of nodes 100-3 (nodes 100-3b and 100-3d).

The node 100-3a may increase the maximum amount of the link key to be shared with the node 100-3b when the decrement frequency of the link key shared with the node 100-3b is higher than the decrement frequency of the link key shared with the node 100-3d, for example. FIG. 17 illustrates the example where the maximum amount of the link key shared with the node 100-3b is increased from 100 to 500.

The node 100-3a may at the same time decrease the maximum amount of the link key shared with the node 100-3d. FIG. 17 illustrates the example where the maximum amount of the link key shared with the node 100-3d is decreased from 300 to 200.

Figure 18:
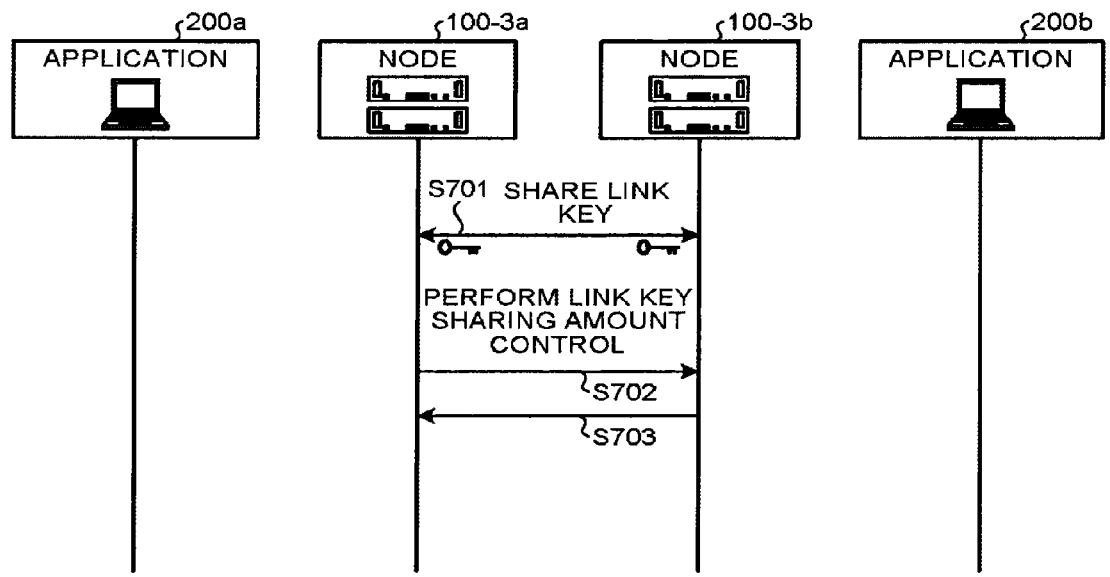
FIG. 18 is a sequence diagram of sharing amount control processing according to the third embodiment.

FIG. 18 is a sequence diagram illustrating an example of the sharing amount control processing (sharing amount control procedure) of the link key according to the present embodiment.

The nodes 100-3a and 100-3b share the link key in advance (step S701).

The node 100-3a transmits a control message to the node 100-3b to notify that a control (link key sharing amount control) which increases the "maximum amount" is to be performed (step S702). The node 100-3b transmits a response message to the node 100-3a as needed (step S703). Information contained in the control message and response message may be similar to that in the second embodiment.

Such configuration allows the node 100-3a to effectively use the storage capacity of a limited storage device (storage 150). Moreover, there can be avoided a situation where a delay is increased by waiting for the link key to be generated in order to supply enough link keys when the link key is requested from the application 200 but the amount of encryption key accumulated is not sufficient due to the small maximum amount of the link key shared with the node 100-3, for example. That is, the sufficient amount of link keys can be supplied with low delay.

Figure 19:
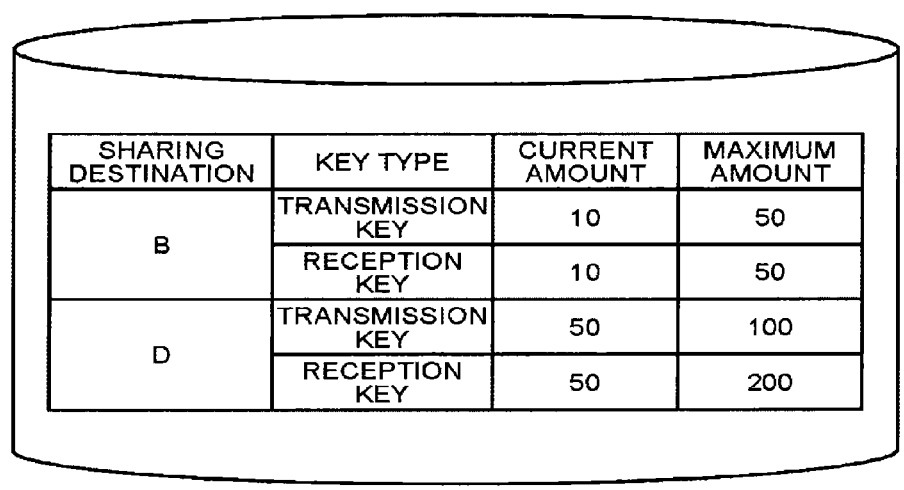
FIG. 19 is a diagram illustrating an example of the link key information table.

The maximum amount and current amount are stored for each node 100-3 of a link connection destination in the link key information table illustrated in FIGS. 14 and 17. Similar to FIG. 7, a link key for transmission and a link key for reception may be distinguishably stored in the link key information table for each node 100-3. FIG. 19 is a diagram illustrating an example of the link key information table stored in the storage 150 of the node 100-3a when the key type is distinguished.

The controller 130-3 may control the monitoring unit 112 to monitor the amount of decrease of the "current amount" of the link key (transmission key or reception key) per unit time, and increase the "maximum amount" of the key with the larger amount of decrease per unit time. Alternatively, for example, the controller 130-3 of the node 100-3a may compare the amount of decrease per unit time of the link key for transmission shared with the node 100-3b and the link key for reception shared with the node 100-3d, and determine to set the "maximum amount" of either key to have a larger amount. Note that a technique such as a Q3P (Quantum Point to Point Protocol) may be used as a method of determining whether the encryption key shared by a quantum key distribution technique be the link key for transmission or the link key for reception.

Fourth Embodiment

A node may store a key information table for both an application key and a link key. The key information table may store information on the application key and the link key separately or store the information on both keys in one table. Moreover, the node may be configured to manage the application key and the link key separately.

Figure 20:
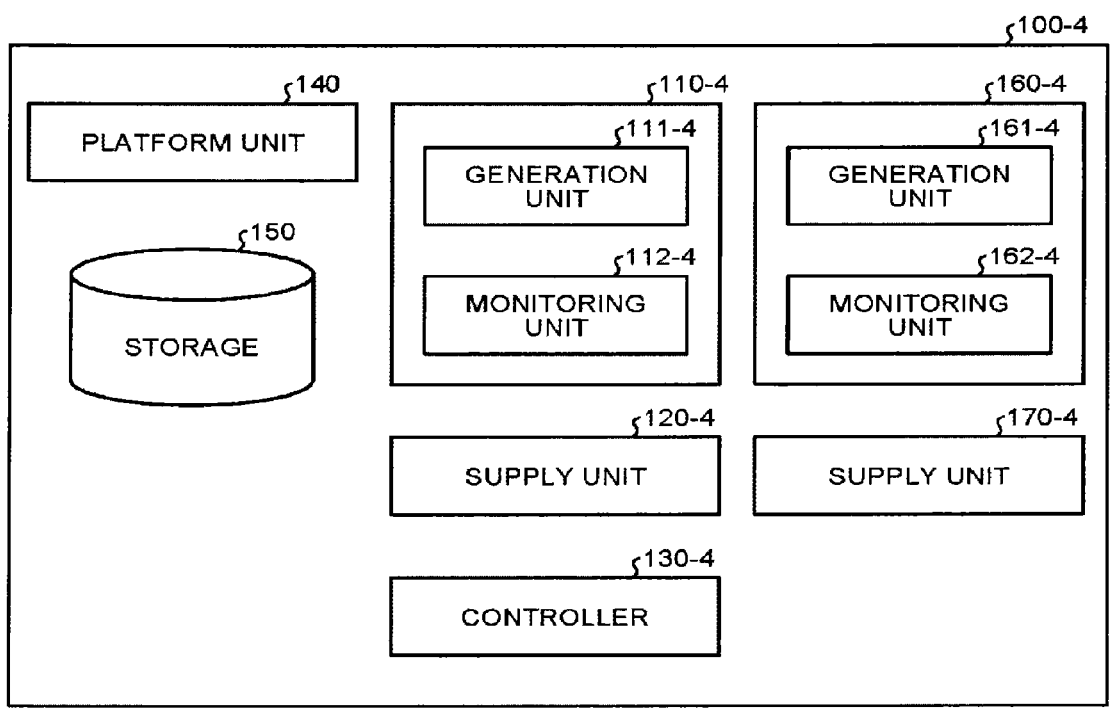
FIG. 20 is a functional block diagram of a node according to a fourth embodiment.

FIG. 20 is a block diagram illustrating an example of a functional configuration of a node 100-4 according to a fourth embodiment with the aforementioned configuration. The node 100-4 includes a sharing processing unit 110-4, a supply unit 120-4, a controller 130-4, a platform unit 140, a storage 150, a sharing processing unit 160-4, and a supply unit 170-4.

The fourth embodiment is different from the first embodiment in terms of the function of each of the sharing processing unit 110-4, supply unit 120-4, and controller 130-4 as well as the addition of the sharing processing unit 160-4 and supply unit 170-4. The rest of the configuration and function is similar to what is illustrated in the block diagram of the node 100 according to the first embodiment as illustrated in FIG. 4, and is thus assigned the same reference numeral as that in FIG. 4 to omit description of such configuration and function.

The sharing processing unit 110-4 performs sharing processing which shares an application key with another node 100-4. The sharing processing unit 110-4 includes a generation unit 111-4 and a monitoring unit 112-4. The generation unit 111-4 generates the application key by using a random number generator, for example. The monitoring unit 112-4 monitors an amount of decrease of the application key stored in the storage 150.

The sharing processing unit 160-4 performs sharing processing which shares a link key with another node 100-4. The sharing processing unit 160-4 includes a generation unit 161-4 and a monitoring unit 162-4. The generation unit 161-4 generates the link key by using quantum cryptography, for example. The generation unit 161-4 may include a function of holding a shared link key. The monitoring unit 162-4 monitors the amount of decrease of the link key stored in the storage 150.

The supply unit 120-4 supplies the application key stored in the storage 150 to an application 200. On the other hand, the supply unit 170-4 supplies the link key stored in the storage 150 to the application 200. The supply unit 170-4 also provides a basic function to perform inter-link communication (link control function) required for an encrypted transfer function of the application key or the like.

The controller 130-4 controls an operation of each of the sharing processing unit 110-4, supply unit 120-4, sharing processing unit 160-4, supply unit 170-4 and the like. The controller 130-4 may dynamically change a reference amount in the key information table as with the second embodiment.

In this case, the controller 130-4 may compare the amount of decrease per unit time of the application key shared with a certain node 100-4 and the link key shared with another node 100-4, and determine to set the "maximum amount" of either key to have a larger amount. Such configuration allows a node to effectively use the storage capacity of a limited storage device (storage 150). Moreover, there can be avoided a situation where a delay is increased by waiting for the link key to be generated or for the application key to be shared in order to supply enough amount of keys when, for example, an encryption key (application key or link key) is requested from the application 200 but the amount of encryption key accumulated is not sufficient due to the small maximum amount of the keys shared with the node 100-4. That is, the sufficient amount of encryption keys having a requested key type can be supplied with low delay.

Figure 21:
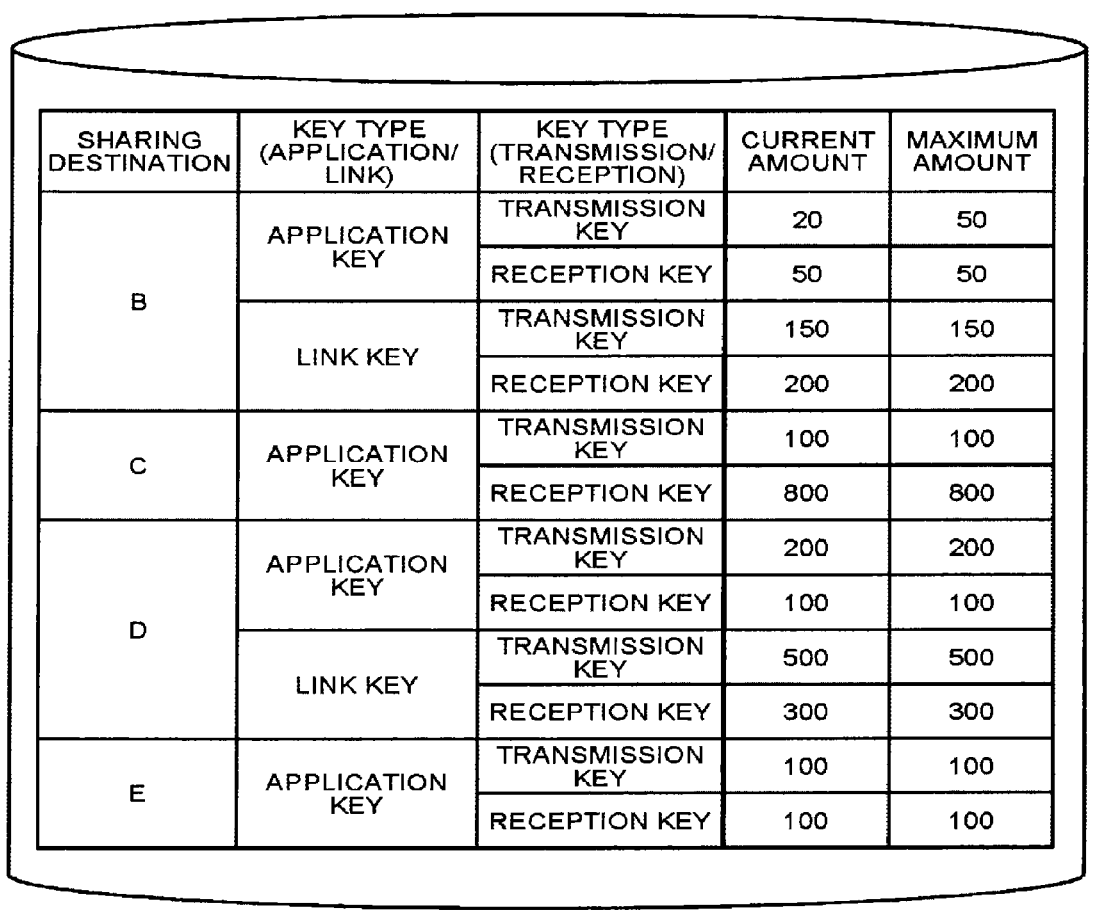
FIG. 21 is a diagram illustrating an example of a key information table.

FIG. 21 is a diagram illustrating an example of the key information table when both the application key and link key are held. When the current amount of all application keys reaches the maximum amount requiring no more generation of an application key nor encrypted transfer, for example, the controller 130-4 may stop generation and accumulation of a link key as there is no need to generate a new application key and perform encrypted transfer thereof.

(Variation)

There has been described the communication system including the plurality of nodes (five nodes in FIG. 2, for example). Two nodes, namely a pair of nodes, may instead be included in the communication system. A system configuration in this case is illustrated in FIG. 1. In this configuration, an application key generated by a random number generator and shared or a link key generated by quantum cryptography as described above may be used as an encryption key that is supplied to an application. When using the application key, there may be provided both an application key information table and a link key information table, or the application key information table alone. When using the link key, the link key information table alone may be provided.

According to the first to fourth embodiments, the encryption key can be supplied to a source from which the encryption key is requested (such as the application) with low delay.

Figure 22:
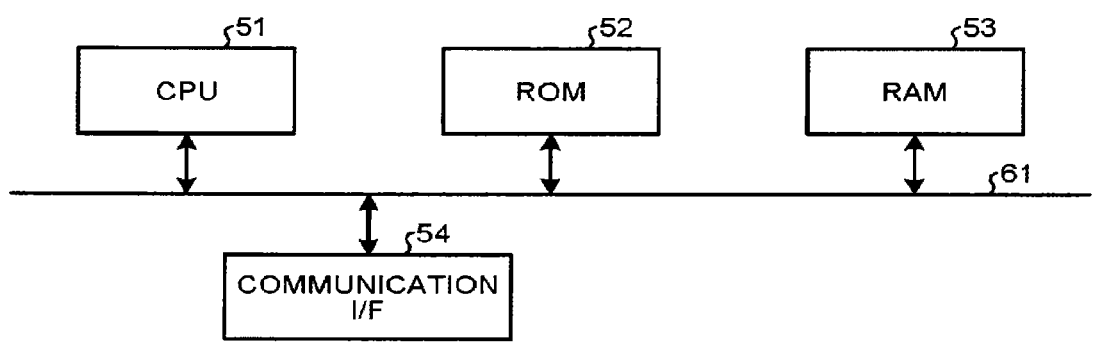
FIG. 22 is a diagram illustrating hardware of a communication device according to an embodiment.

Next, a hardware configuration of the communication device according to the first to fourth embodiments will be described with reference to FIG. 22. FIG. 22 is a diagram illustrating an example of the hardware configuration of the communication device according to the first to fourth embodiments.

The communication device according to the first to fourth embodiments includes a controller such as a CPU (Central Processing Unit) 51, storages such as a ROM (Read Only Memory) 52 and a RAM (Random Access Memory) 53, a communication I/F 54 which performs communication by connecting to a network, and a bus 61 connecting each unit.

A program run by the communication device of the first to fourth embodiments is provided while incorporated in advance in the ROM 52 or the like.

The program run by the communication device of the first to fourth embodiments may be configured to be provided as a computer program product while recorded in a computer-readable recording medium such as a CD-ROM (Compact Disk Read Only Memory), a flexible disk (FD), a CD-R (Compact Disk Recordable), or a DVD (Digital Versatile Disk), the program having an installable or executable file format.

Moreover, the program run by the communication device of the first to fourth embodiments may be stored on a computer connected to a network such as the Internet and provided by downloading via the network. The program run by the communication device of the first to fourth embodiments may also be provided or distributed via the network such as the Internet.

The program run by the communication device of the first to fourth embodiments can cause a computer to function as each unit of the aforementioned communication device. The computer can operate when the CPU 51 reads the program from a computer-readable storage medium to a main storage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   a sharing processing unit to share an encryption key with one or more external devices;
   a storage to store therein the encryption key; and
   a controller to compare a current amount representing an amount of the stored encryption key with a specified reference amount and perform control to continue or stop sharing processing, which is performed by the sharing processing unit, for sharing the encryption key on the basis of a comparison result,
   wherein the controller further changes the reference amount according to a decrement frequency of the current amount.

2. The device according to claim 1, wherein the controller continues the sharing processing when the current amount is smaller than the reference amount and stops the sharing processing when the current amount is larger than or equal to the reference amount.

3. The device according to claim 1, further comprising a supply unit to supplies the stored encryption key to one or more applications and delete the supplied encryption key from the storage.

4. The device according to claim 3, wherein the controller further changes the reference amount according to the number of the applications.

5. The device according to claim 3, wherein the controller further changes the reference amount according to an amount of the encryption key requested from the applications.

6. The device according to claim 1, wherein the controller further changes the reference amount according to at least one of a storage capacity of the storage and a free space in the storage.

7. The device according to claim 1, wherein
   the storage stores therein the encryption key for each external device, and
   the controller compares, for each external device, the current amount with the reference amount and performs control to continue or stop the sharing processing performed by the sharing processing unit for sharing the encryption key on the basis of a comparison result.

8. The device according to claim 1, wherein the sharing processing unit shares a second encryption key, which is encrypted with a first encryption key shared with a first external device among the external devices, with a second external device among the external devices by transferring the second encryption key to the second external device through the first external device.

9. The device according to claim 1, wherein the sharing processing unit shares the encryption key with the external device by quantum key distribution.

10. The device according to claim 1, wherein
    the encryption key includes an encryption key for transmission used in transmitting information and an encryption key for reception used in receiving information, and
    the controller compares a current amount representing an amount of the stored encryption key for transmission with a first reference amount to perform control, on the basis of a comparison result, to continue or stop sharing processing, which is performed by the sharing processing unit, for sharing the encryption key for transmission, and compares a current amount representing an amount of the stored encryption key for reception with a second reference amount to perform control, on the basis of a comparison result, to continue or stop sharing processing, which is performed by the sharing processing unit, for sharing the encryption key for reception.

11. A non-transitory computer-readable medium having stored thereon computer-readable instructions which when executed by a computer cause the computer to perform a method comprising:
    sharing an encryption key with one or more external devices;
    storing therein the encryption key;
    comparing, via circuitry, a current amount representing an amount of the stored encryption key with a specified reference amount; and
    performing control to continue or stop sharing processing for sharing the encryption key on the basis of a comparison result,
    wherein the circuitry further changes the reference amount according to a decrement frequency of the current amount.

12. A communication system comprising:
    a plurality of communication devices, wherein
        each of the communication devices includes:
            a sharing processing unit to share an encryption key with one or more of the other communication devices;
            a storage to store therein the encryption key; and a controller to compare a current amount representing an amount of the stored encryption key with a specified reference amount and perform control to continue or stop sharing processing, which is performed by the sharing processing unit, for sharing the encryption key on the basis of a comparison result, wherein the controller further changes the reference amount according to a decrement frequency of the current amount.

* * * * *